United States Patent
Arnauts (12)

(10) Patent No.: US 9,162,381 B2
(45) Date of Patent: Oct. 20, 2015

(54) METHOD, DEVICE AND A COMPUTER PROGRAM FOR MANUFACTURING A PRE-INSULATED SKELETON FRAMING SEGMENT

(75) Inventor: Dirk Arnauts, Stadtlohn (DE)

(73) Assignee: MOPAC SYSTEMS INTERNATIONAL S.A., Luxembourg (LU)

( * ) Notice: Subject to any disclaimer, the term of this patent is extended or adjusted under 35 U.S.C. 154(b) by 539 days.

(21) Appl. No.: 13/578,472

(22) PCT Filed: Feb. 14, 2011

(86) PCT No.: PCT/IB2011/050598
§ 371 (c)(1),
(2), (4) Date: Oct. 11, 2012

(87) PCT Pub. No.: WO2011/098984
PCT Pub. Date: Aug. 18, 2011

(65) Prior Publication Data
US 2013/0037984 A1 Feb. 14, 2013

(30) Foreign Application Priority Data

| Feb. 12, 2010 | (BE) | .................................. | 2010/0082 |
| Feb. 12, 2010 | (NL) | ..................................... | 1037711 |
| Apr. 7, 2010 | (DE) | .................... | 20 2010 004 816 U |
| Jul. 1, 2010 | (NL) | ..................................... | 1038078 |

(51) Int. Cl.
*B29C 44/18* (2006.01)
*B29C 44/12* (2006.01)
(Continued)

(52) U.S. Cl.
CPC ........... *B29C 44/1228* (2013.01); *B29C 44/186* (2013.01); *B29C 44/60* (2013.01);
(Continued)

(58) Field of Classification Search
CPC .. B29C 44/1228; B29C 44/186; B29C 44/60; E04C 2/38; E04C 2/386
USPC .......................... 264/46.5, 46.4; 425/112, 128
See application file for complete search history.

(56) References Cited

U.S. PATENT DOCUMENTS 5,640,812 A 6/1997 Crowley et al.
6,609,041 B1 8/2003 Sanka et al.
(Continued)

FOREIGN PATENT DOCUMENTS

DE 29614723 U1 2/1997
DE 102005002877 A1 8/2006
(Continued)

OTHER PUBLICATIONS

JP2009101562A Machine Translation JAP to ENG.*
(Continued)

*Primary Examiner* — Alison Hindenlang
*Assistant Examiner* — Lawrence D Hohenbrink, Jr.
(74) *Attorney, Agent, or Firm* — Workman Nydegger

(57) ABSTRACT

A method, a device and a computer program for manufacturing a pre-insulated skeleton framing segment (1) for a building to be constructed, wherein an assembly (2) with a hollow space (14) is provided, to which a data carrier (40) is fitted including data from which a quantity of raw materials required for forming a foam insulation layer of a thickness (15) in the hollow space (14) can be determined, which quantity is calculated, and which raw materials are inserted in the hollow space (14), and foam and harden there during a period (T).

23 Claims, 18 Drawing Sheets

(51) Int. Cl.

| | | |
|---|---|---|
| *B29C 44/60* | (2006.01) | |
| *E04C 2/296* | (2006.01) | |
| *E04C 2/38* | (2006.01) | |
| B29C 44/02 | (2006.01) | |
| B29C 44/10 | (2006.01) | |
| B29C 39/10 | (2006.01) | |
| B29C 39/44 | (2006.01) | |
| B29K 75/00 | (2006.01) | |
| B29L 31/10 | (2006.01) | |

(52) U.S. Cl.
CPC ............... *E04C 2/296* (2013.01); *E04C 2/386* (2013.01); *B29C 39/10* (2013.01); *B29C 39/44* (2013.01); *B29C 44/025* (2013.01); *B29C 44/10* (2013.01); *B29C 44/1276* (2013.01); *B29K 2075/00* (2013.01); *B29L 2031/10* (2013.01)

(56) References Cited

U.S. PATENT DOCUMENTS

| 6,640,812 | B2 | 11/2003 | Ayzman |
| 2001/0047251 | A1 | 11/2001 | Kemp |
| 2005/0055973 | A1 | 3/2005 | Hagen, Jr. et al. |
| 2006/0260267 | A1* | 11/2006 | Hagen et al. ............... 52/745.19 |
| 2008/0086978 | A1* | 4/2008 | Gilgan et al. ............... 52/745.06 |
| 2008/0168741 | A1* | 7/2008 | Gilgan et al. ............... 52/745.19 |

FOREIGN PATENT DOCUMENTS

| EP | 1683617 | A2 | | 7/2006 |
| GB | 1335496 | | | 10/1973 |
| GB | 2144163 | A | | 2/1985 |
| GB | 2282628 | A | * | 4/1995 |
| JP | 10-58466 | A | | 3/1998 |
| JP | 2006001263 | A | | 1/2006 |
| JP | 2009-101562 | A | | 5/2009 |
| JP | 2009101562 | A | * | 5/2009 |

OTHER PUBLICATIONS

Australian Office Action dated Apr. 14, 2014 for AU 2011213957.
European Office Action for related application EP 11714659.7, dated Dec. 6, 2013.
International Search Report for PCT/IB2011/050598, Jul. 6, 2011.
Canadian Office Action dated May 29, 2015, for CA 2,789,635.

* cited by examiner

METHOD, DEVICE AND A COMPUTER PROGRAM FOR MANUFACTURING A PRE-INSULATED SKELETON FRAMING SEGMENT

BACKGROUND OF THE INVENTION

1. Field of the Invention

The invention relates to a method for manufacturing a pre-insulated skeleton framing segment for a building to be constructed, more specifically a skeleton framing segment which is at least partially filled with a foam insulation layer during its production.

The invention also relates to a pre-insulated skeleton framing segment manufactured according to this method and to a building which comprises these skeleton framing segments.

The invention also relates to a device and a computer program provided for carrying out this method.

2. Background

For the construction of skeleton apartments a method is known for producing prefab wall panels of standard dimensions which are secured to each other on site. These panels generally consist of two parallel wooden boards which are secured to a frame (also called skeleton or framework) located between the two boards. To increase the insulation of the apartment, these wall panels are generally insulated on the site by making openings in the wooden boards and pouring a cellulose insulation into the openings. A drawback of this method is that it is highly labour intensive, that the openings in the boards have to be made in visible positions, and that a great deal of insulating material is wasted in most cases.

Alternatively the wall panels are pre-insulated in the factory with a soft insulation material such as glass wool or rock wool, or with hard insulation panels which have to be cut to size. However, a disadvantage of this method is that the wall panels are often poorly insulated and that there is a lot of cutting waste of the insulation material and that the method is labour intensive.

EP1683617A2 discloses a method for the automatic manufacture of panels, followed by a separate filling process in which a multiplicity of openings is made in both panels, the panels being inserted horizontally in a filling unit, and where pre-expanded filling material is inserted along openings in the uppermost panel in certain spaces between the panels, and where steam is then injected along openings in the bottom panel to bind the filling material. A disadvantage of this method is that it is highly labour intensive and susceptible to errors.

SUMMARY OF THE INVENTION

It is an object of the invention to provide a method for manufacturing a pre-insulated skeleton framing segment for buildings of various dimensions, which method is less susceptible to error and is less labour intensive without creating more waste of insulation material.

This object is achieved according to the invention by a method which has the technical features of the first claim.

Thereto the method according to the invention comprises the following steps: a) receiving an assembly which has at least one compartment with a hollow space which is to be filled at least partially with a foam insulation layer, and wherein a data carrier containing data of the at least one compartment is fitted to the assembly, from which data a quantity of raw materials required for forming the foam insulation layer with a predetermined thickness in the at least one compartment can be determined; b) reading the data carrier; c) determinating a quantity of raw materials which are to be inserted in the at least one compartment for forming the foam insulation layer with the predetermined thickness on the basis of the data on the data carrier; d) inserting the determined quantity of raw materials in the at least one compartment for forming the foam insulation layer with the predetermined thickness; e) allowing the foam insulation layer to foam and harden in the at least one compartment during a predetermined period.

In this patent publication the term "raw materials" refers to the one or more raw materials intended for forming the foam insulation material, even if only one raw material is used.

In this patent publication the term "assembly" refers to part of the "skeleton framing segment" before the foam insulation layer is applied. It comprises a frame and at least one flat panel.

By fitting the data carrier all the required data, such as dimensions of the assembly and the number, size and location of the spaces to be filled, can be read or retrieved, and optionally also the spaces which are not to be filled. Because the operator does not need to enter these data into the system himself errors are avoided and the filling process becomes less labour intensive.

By reading or retrieving the required data instead of entering into the machine locally, no powerful computer with a graphic interface is required in the industrial production space where the filling takes place.

By making use of the data of the assembly, the production process can be automated to a high degree and skeleton framing segments in different shapes and dimensions can be produced (every apartment is different). Moreover, the dimensions, and particularly the thickness of the insulation layer, can be adapted to the specific wishes or requirements of the customers, e.g. budget and/or requirements as a result of the climate and/or legal requirements. The skeleton framing segments therefore need no longer have standard dimensions, which implies an enormous degree of freedom for designing the building, without any appreciable increase in price.

By reading or retrieving the data, the shape and number of the compartments of the assembly to be filled, and their position, are known precisely, and the required quantity of raw materials for each compartment can be determined to the optimum degree from the dimensions of the compartment, taking into consideration the desired thickness of the foam insulation layer to be inserted therein.

By accurately determining the quantity of raw materials before the insertion, instead of filling the space until an excess of insulation material comes out, material costs are saved and the waste resulting from surplus insulation material which has to be removed afterwards is avoided or reduced to a minimum, which is also favourable to the environment.

By using a suitable foam insulation material the skeleton framing panel can be sealed so that it is airtight, and chinks and cracks can e avoided, which is important for passive and zero energy apartments.

The method according to the present invention allows the hollow spaces to be at least partially filled without making openings in the panels in a visible position so that the openings are invisible when the skeleton framing panel is placed in the building, which is aesthetically more attractive. In this manner extra operations for finishing (e.g. filling) the visible openings are also avoided and the insulation value of the panel is increased.

Thanks to the application of raw materials which are able to foam, moreover good adhesion is obtained of the foamed insulating material to the walls of the skeleton framing segment. The risk of condensation between a wall of the assembly and the insulating material is avoided or at least reduced by this adhesion. By suitable selection of the raw materials the insulating material may also provide extra mechanical strength to the skeleton framing segment, particularly against bending or buckling, which is important for a building with several floors. This is particularly the case when a hard foam is used.

Another advantage of insulation during production is that it prevents damage to the skeleton framing segment due to forces which are exerted during foaming and hardening of the insulating material. This is not practicable in situ, at least not with polyurethane, where enormous forces are exerted on the skeleton framing segment.

In an embodiment of the method according to the present invention it is moreover possible to fill the compartments of the skeleton framing segment over a limited thickness only. This is not possible if the skeleton framing segment is insulated in situ, where the skeleton framing panels are placed in an upright position.

The method according to the invention also provides the possibility of manufacturing a monolithic wall in which technical devices (e.g. electricity cables or water pipes) are installed and which is nevertheless thermally insulated to the optimum degree and is airtight.

In an embodiment of the method, the assembly is manufactured on the basis of a 3D computer model represented by CAD data which is stored in a database under an identification code of the assembly, the data on the data carrier comprise the identification code, and step c) comprising the following substeps: the retrieval of the CAD data of the assembly from the database on the basis of the identification code, and determining the quantity of raw materials on the basis of the retrieved CAD data.

In this patent publication "CAD data" refers to the digital data for representing and storing a three-dimensional object. CAD data stands for "Computer Aided Design", or drawing program data. They comprise, among other things, the dimensions of the beams and their mutual position.

By identifying the assembly on the basis of the identification code, it is possible, when filling, to use the same CAD data (or data derived from it but in any case consistent data) as the data which was used for manufacturing the assembly, so that the data does not need to be re-entered into the filling unit, which is less labour intensive and prevents errors from being made.

Preferably the data on the data carrier comprise the dimensions of the at least one compartment, and step c) comprises the calculation of the quantity of raw materials to be inserted from the dimensions and from the predetermined thickness of the foam insulation layer to be applied.

When the data carrier itself contains the data required for filling, these data need not be retrieved from elsewhere (e.g. via a network), which is generally faster and more robust. In this way the assembly unit can even be physically disconnected from the filling unit, whilst both units still use consistent data, even if the filling were to be carried out in another location. Because the units are able to operate "stand-alone", complex interface problems between both units are also avoided.

By putting the dimensions of the compartment to be filled on the data carrier instead of the volume, the filling unit can not only determine the optimum quantity itself, optionally taking account of ambient factors such as temperature, moisture, it can also optimise the way in which these raw materials are best inserted. For instance, "narrow, deep" spaces (e.g. 280 cm deep×20 cm wide×20 cm high) may be filled differently from "shallow, wide" spaces (e.g. 60 cm deep×60 cm wide×20 cm high).

Preferably the method comprises a calibration phase in which a list of compartments with their dimensions is stored in a memory together with suitable process parameters for inserting the raw materials in these compartments, and a normal production phase in which process parameters are determined for inserting the determined quantity of raw materials in each compartment to be filled on the basis of the dimensions of that compartment and on the basis of the list in the memory.

Tests have shown that the filling of compartments with highly variable dimensions cannot be carried out to the optimum degree by one and the same method. Thus a "narrow, deep" space should be filled differently from a "shallow, wide" space to achieve optimum filling and foaming. Thanks to the memory optimum process parameters can be stored for a number of compartments with different dimensions during a calibration phase preceding production, and optimum process parameters can be derived from this memory during normal production. In this manner not only is the quantity of raw materials optimally determined but the conditions under which they are inserted in the compartment can also be optimally determined, giving rise to a very high quality end product.

The at least one raw material is preferably a liquid raw material.

By making use of a liquid raw material which can be easily supplied through a hose, the dragging and cutting to size of hard and soft insulation panels can be avoided, thereby avoiding cutting losses and reducing manual work to a minimum. Another advantage is that a liquid raw material can easily be distributed (e.g. by injection or spraying) throughout the compartment, particularly also in the corners and against the upright walls of the compartment. Moreover, a liquid raw material will generally adhere better to the inner wall of the assembly, thus providing better thermal and mechanical properties of the skeleton framing segment, due among other things to the avoidance of cracks or chinks. Furthermore, a liquid raw material is able to flow out and be distributed uniformly over the space to be filled.

The foam insulation layer is preferably a polyurethane foam. The raw materials preferably contain a polyol and an isocyanate.

It is known that polyurethane can be manufactured from an isocyanate and a polyol, which can be made "to measure", for forming soft or hard foams. Polyurethane foams are good thermal insulators. In particular, a hard polyurethane foam is ideally suited for this application since it also has high compressive and tensile strength. In this way the hard foam can also contribute to the stability of the structure. It is also known that considerable forces can be generated during foaming and hardening of polyurethane foam, but by accurately determining the quantity of raw materials to be inserted in each compartment to be filled, the forces which are generated during foaming and hardening of the polyurethane foam can remain limited, thus avoiding any damage to the skeleton framing panels, even those of different dimensions and shapes (e.g. with/without windows or doors).

The assembly is preferably placed in a lying position before the determined quantity of raw materials is inserted in the at least one compartment.

By positioning the assembly and hence also the compartment with the hollow space in a lying position, the raw material, preferably liquid raw material, can be better dispersed over the bottom of the compartment, and a more uniform density of the insulating foam is achieved than is the case if an assembly were to be filled in an upright position. This prevents the raw material and/or the insulation material from accumulating in certain locations, as a result of which an irregular thickness and irregular force distribution would arise during foaming and hardening of the foam insulation material. Another advantage of positioning the assembly in a lying position is that the foaming only takes place over a limited height, namely the thickness of the panel (e.g. 25 cm) instead of over the entire height of a floor of a building (e.g. 300 cm), as a result of which the density of the insulation material will be more uniform.

In a first preferred embodiment of the method according to the invention the assembly is a substantially closed assembly which comprises a first and a second flat panel, secured parallel to each other and at a distance from each other to a frame so that the frame is located between the first and the second flat panel for forming the hollow space between the flat panels, and wherein the predetermined thickness of the foam insulation layer to be inserted is equal to the distance between the first and second flat panel for substantially completely filling the hollow space, and wherein the at least one compartment is provided with at least one opening which is provided in the frame for the insertion of a nozzle for injecting the raw materials for forming the foam insulation layer, and wherein the method further comprises the steps of inserting the assembly in a press, and exerting compressive forces on the assembly during the predetermined period after insertion of the raw materials, for counteracting the forces exerted by the foam insulation layer on the assembly during its foaming and hardening.

"Substantially closed assembly" refers to an assembly with closed hollow spaces, apart from the openings in the frame for inserting the raw materials.

By providing openings in the frame (also called skeleton or framework) instead of in the flat panels, the raw material can easily be inserted along the lateral side when the assembly is in a lying position in a press. This also avoids the need for openings in the flat panels, as a result of which the skeleton framing panel has a higher insulation value, requires less finishing and is also aesthetically more attractive.

By making use of a press expansion of the assembly as a result of the foaming and hardening of the foam insulation is counteracted, and damage to the assembly prevented. Such damage is a well known problem when insulating skeleton framing panels with a foam insulation in situ, where it is not practicable and economical to counteract the forces of expansion externally, which forces should then be fully opposed by the assembly itself.

By completely filling the hollow space between the two flat panels the thickness of the skeleton framing segment is used to the maximum, which improves the thermal and acoustic insulation and the mechanical strength of the panel.

Because the raw material is inserted in a closed space between two flat panels, the foam insulation material will adhere to both flat panels, which improves the mechanical properties (compressive strength, tensile strength, bending strength) of the skeleton framing panel relative to a panel in which the adhesion only takes place to one flat panel, and is considerably increased relative to a panel where there is no adhesion on any of the plates.

By accurately determining the quantity of raw materials required, excessive forces can be prevented from being exerted on the press, thus reducing the cost price of the press (less strong) and the risk of damage to it.

In this case a position of the at least one opening in the frame is preferably determined on the basis of the data on the data carrier, and the insertion of the raw materials in step d) comprises the displacement of the nozzle towards the determined position for injecting the raw materials for forming the foam insulation layer.

By determining the number of openings and the position of each opening in the frame, a nozzle can be positioned automatically in or in front of the opening of the compartments to be filled, and the desired quantity of raw materials can be inserted in each compartment in the most optimum manner. This enables the assembly to be filled quickly and without errors, and the production speed to be maximised and the number of operations of an operator to be minimised.

In this case preferably at least two assemblies are inserted next to each other in the press. Alternatively, or in combination with them, preferably at least two assembles are inserted one above the other in the press.

By inserting a plurality of assemblies simultaneously in the press the production capacity can be considerably increased, since in this case several panels can be filled during the same pressing time instead of only one.

Preferably the first embodiment also comprises the step of closing the at least one opening by fitting and securing a sealing element with a conical shape which is provided for easy positioning of the skeleton framing segment on top of another skeleton framing segment with a complementary shape.

This considerably accelerates and simplifies the final positioning of the skeleton framing segment at the site where the building is erected, and better mechanical coupling is achieved between skeleton framing segments placed one on top of each other.

In a second preferred embodiment of the method according to the invention the assembly is a half-open assembly which comprises a frame secured to a first flat panel, and wherein the method further comprises the steps of:

j) allowing the foam insulation layer to freely foam and harden during the predetermined period after insertion of the raw materials;

k) providing a second flat panel, and after expiration of the predetermined period, securing it to the frame in such a manner that the frame is located between the first and the second flat panel.

A second preferred embodiment of the method according to the invention departs from a half-open assembly which comprises a frame with one flat panel, which assembly is positioned in a lying position so that a compartment is formed having a bottom formed by part of the flat panel, and having an upright wall formed by part of the frame. This provides the extra possibility of not filling the compartment over the entire thickness, but only partially, whilst all corners and walls can be covered so that they are airtight. The method according to the present invention therefore provides an extra form of flexibility where the thickness of the insulation layer can be tailored to the requirements of the customer, and may be selected smaller than the thickness of the frame.

By allowing the foam insulation to foam freely, i.e without counter-pressure from the second flat panel, the density of the insulation material will be less than if the second plate were present, as in the first preferred embodiment. This allows extra insulation material savings.

Another advantage of this method is that no compressive forces need to be exerted on the second flat panel, thus avoiding the need to purchase an expensive press, without the risk of damage to the skeleton framing segment, more specifically the loosening or deformation of the second flat panel. If the hollow space is only filled to a limited degree, the second plate can be fitted before the foam insulation is fully hardened, since the risk of the foam touching the second plate is minimal in that case. This saves time and the productivity is increased.

In this case preferably a position of the at least one compartment in the assembly is determined, and the insertion of the raw materials in step d) comprises the displacement of a nozzle to above the determined position for injecting the raw materials for forming the foam insulation layer.

By determining the position of the compartment in the assembly, a nuzzle can be automatically positioned above the compartments to be filled, and the desired quantity of raw materials for each compartment can be inserted. This enables the half-open assembly to be filled quickly and without errors, and to achieve a high production speed with minimal operations carried out by an operator.

A further object of the invention is to provide a pre-insulated skeleton framing segment which was manufactured according to the above method.

The invention also relates to a building which comprises such a pre-insulated skeleton framing segment.

A further object of the invention is to provide a device for manufacturing a pre-insulated skeleton framing segment for a building to be constructed, according to the independent claim relating to the device.

It is also an object of the invention to provide a computer program which is directly loadable into the internal memory of the digital computer system of the above-mentioned device, comprising software code fragments for executing the above-mentioned method.

BRIEF DESCRIPTION OF THE DRAWINGS

The invention is explained in greater detail by the description below and the accompanying figures of preferred embodiments of a method, a skeleton framing segment and a device according to this invention.

FIG. 5A shows in perspective view a preferred embodiment of a substantially closed assembly which can be used in the first preferred embodiment of the method according to the invention. (Part of the second panel has been removed for illustrative reasons so that the compartments and openings are clearly visible).

FIG. 5B shows in perspective view the assembly of FIG. 5A after filling the compartments with a foam insulation layer, again partially opened to clearly illustrate the compartments. The central compartment, intended for window opening, is not filled with a foam insulation layer.

FIG. 5C shows a cross-section of the pre-insulated skeleton framing panel of FIG. 5B, according to section A-A.

FIG. 6A shows a closed assembly which has been partially opened to clearly illustrate the compartments and openings.

FIG. 6B shows the assembly of FIG. 6A after filling the compartments without a socket with a first foam insulation raw material, and after filling the compartments with a socket with a second foam insulation raw material, again partially opened for illustrative reasons.

FIG. 6C shows a section of the pre-insulated skeleton framing segment of FIG. 6B, according to section B-B.

FIG. 8A shows an embodiment of a half-open assembly manufactured from the frame of FIG. 2 and the flat panel of FIG. 3, in perspective.

FIG. 8B shows the insertion and distribution of raw materials for a foam insulation layer by means of a cross-section of the half-open assembly of FIG. 8A, according to section C-C.

FIG. 8C shows a cross-section of a pre-insulated skeleton framing segment according to the invention, after fitting a second flat panel on the half-open assembly of FIG. 8B.

FIG. 9A shows the same assembly as FIG. 8A.

FIG. 9B shows a cross-section of the half-open assembly of FIG. 9A, after the free foaming of the foam insulation layer to above the wall of the frame, according to section C-C.

FIG. 9C shows the assembly of FIG. 9B after the part of the foam insulation layer that projects above the wall of the frame has been removed.

FIG. 9D shows the assembly of FIG. 9C in perspective. The central compartment intended for a window opening is not filled with a foam insulation layer.

FIG. 9E shows a cross-section of a skeleton framing segment according to the invention, after the fitting of a second flat panel on the half-open assembly of FIG. 9C.

DETAILED DESCRIPTION OF PREFERRED EMBODIMENTS OF THE INVENTION

Figure 1:
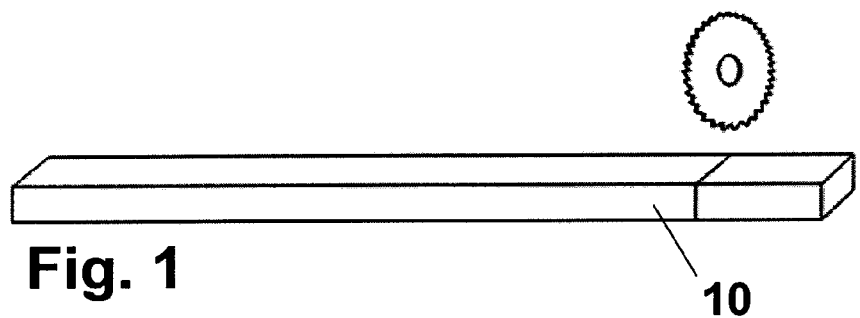
FIG. 1 shows a wooden or metal beam as a structural element for the assembly.

Reference Numbers
 1 skeleton framing segment
 2 assembly
 3 first flat panel
 4 frame
 5 compartment
 6 bottom
 7 upright wall
 8 foam insulation layer
 9 height of the upright wall
 10 beam
 11 opening
 13 second flat panel
 14 hollow space
 15 thickness of the foam insulation layer
 16 plan of a building
 17 tank for raw material
 18 supply station
 19 device
 20 computer system
 21 database
 22 assembly unit
 23 positioning means
 24 filling unit
 25 nozzle
 26 second assembly means
 27 removal means
 29 temperature sensor
 30 finishing means
 31 press
 32 feed table
 33 first clamping plate (of the press)
 34 second clamping plate (of the press)
 37 carriage
 38 hose
 40 data carrier (e.g. barcode)
 41 positioning means
 42 positioning means
 49 socket
 50 opening for a window
 51 opening for a door
 52 end stop
 53 flap, valve The present invention provides an efficient solution for manufacturing pre-insulated panels, also referred to as skeleton framing segments 1, for buildings such as flats, apartments and hospitals. Prefab flats are traditionally built with hollow skeleton framing segments which are insulated in situ, e.g. by injecting a cellulose insulation, or they can be pre-insulated with e.g. glass wool or rock wool (also called rockwool) during their production. These skeleton framing segments 1 comprise in most cases one complete side wall of a floor of a building, and they may be used both on the outside of a building (as an outer wall) and on the inside of a building (as an interior wall). The skeleton framing segments 1 may have openings 50, 51 for securing windows or doors, or they may be used, for example, for the construction of a roof.

Traditional skeleton framing segments 1 generally comprise two parallel panels 3, 13 with a framework or skeleton there between, also called frame 4 in the following, thus defining a number of individual compartments 5 with hollow spaces 14. When such skeleton framing segments 1 are insulated in situ, traditionally an opening 11 is made in one of the two panels 3, 13, through which a cellulose insulation material, such as e.g. Isofloc®, is then inserted in the spaces. It requires a great deal of specialist knowledge and experience to apply this material in a professional manner, but even then the conditions for applying it are far from ideal. There is e.g. an inherent problem in that the skeleton framing segments 1 stand upright, causing the insulation material to flow downwards or drop so that the density at a bottom of the skeleton framing segment 1 is in most cases higher than at the top. This may occur during the insertion itself, but sagging may also occur afterwards. Moreover there is no way whatsoever for controlling the filling. Furthermore, the injected quantity of insulation material is not pre-calculated, so that generally an excess of insulation material is inserted which for the most part comes back through the opening after it has expanded, which results in an enormous waste of insulation material. Moreover, the insulation materials used are not airtight, which is an important consideration in passive and zero energy apartments.

The patent publication GB1335496 was filed almost 40 years ago and discloses a method for manufacturing pre-insulated panels, wherein a panel with lateral openings is placed in a press. Pipes with lateral openings are installed in the panel for dispersing a synthetic resin. The quantity of resin which is applied is proportional to the volume to be filled, and the quantity of raw material inserted is determined by means of a timer. There is no mention of computers, which therefore means that everything had to be calculated manually and set by the operator, which is highly labour intensive and subject to error. This method may be technically and economically feasible for the production of large series of panels with the same dimensions, it is not so for custom-made products.

The manufacture of assemblies 2 has seen strong development in the past 40 years. There exist therefore at present (in 2011) fully automatic assembly machines available for the manufacture of custom-made assemblies 2. These are stand-alone machines which supply a non-insulated wooden skeleton framing panel. Skilled manual work is still required afterwards to install electrical cables, fit windows and doors or to insulate the panels. Such machines are e.g. commercially available from the company Weinmann®. As far as the inventor is aware, however, there is no method or device which has currently been optimised for manufacturing pre-insulated skeleton framing panels for skeleton framing apartments with arbitrary dimensions.

Figure 4A:
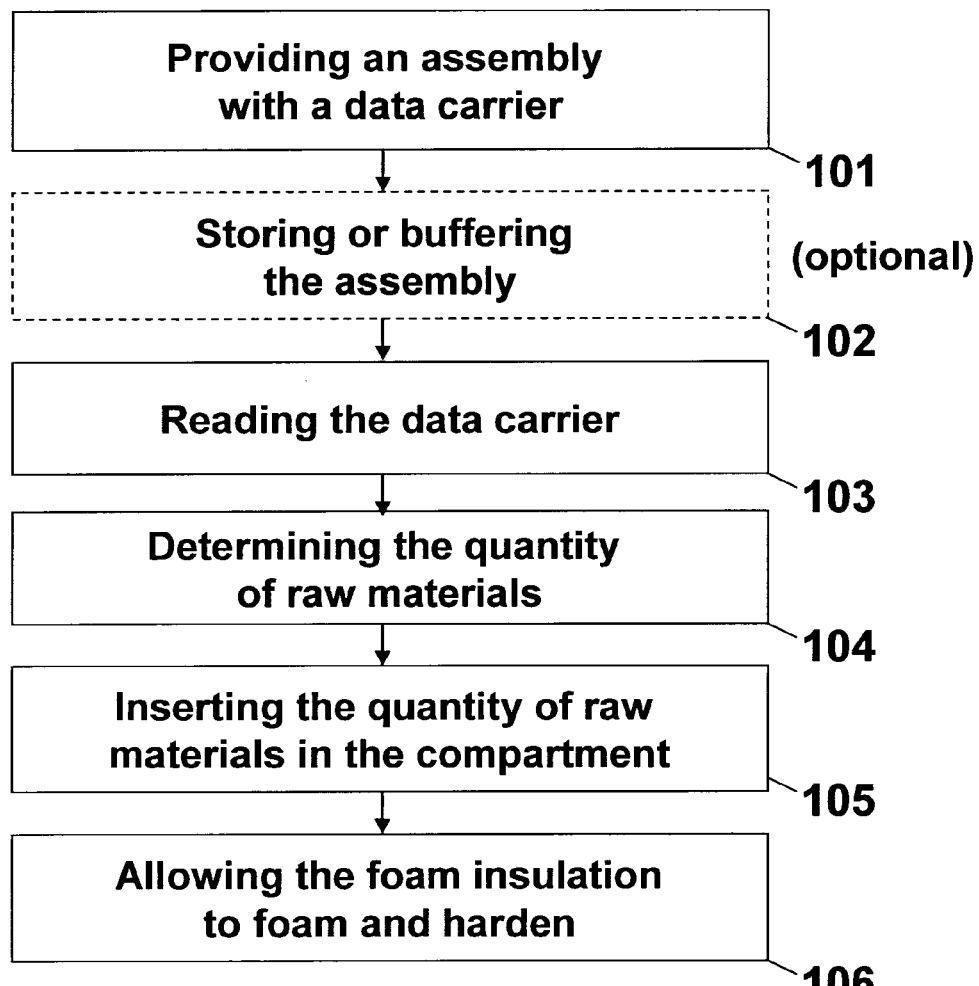
FIG. 4A shows the method for manufacturing a pre-insulated skeleton framing segment according to the present invention. This method can be implemented by the device of FIG. 11A.

As shown in FIG. 4A, the present invention provides a method for manufacturing a pre-insulated skeleton framing segment 1 for buildings of various dimensions, the method comprising the steps of: a) receiving an assembly 2 which has at least one compartment 5 with a hollow space 14 which is to be at least partially filled with a foam insulation layer 8, and whereby a data carrier 40 containing data of the at least one compartment 5 is fitted to the assembly 2, from which data a quantity of raw materials required for forming the foam insulation layer 8 with a predetermined thickness 15 in the at least one compartment 5 (step 101) can be determined; b) the reading of the data carrier 40 (step 103); c) the determination of a quantity of raw materials which are to be inserted in the at least one compartment 5 for forming the foam insulation layer 8 with the predetermined thickness 15 on the basis of the data on the data carrier 40 (step 104); d) the insertion of the determined quantity of raw materials in the at least one compartment 5 for forming the foam insulation layer 8 with the predetermined thickness 15 (step 105); e) allowing the foaming and hardening of the foam insulation layer 8 in the at least one compartment 5 during a predetermined period T (step 106).

This is the most general form of a method according to the invention. Note that this method enables one manufacturer to manufacture the assemblies and another manufacturer to fill the assemblies with insulation material.

Figure 11A:
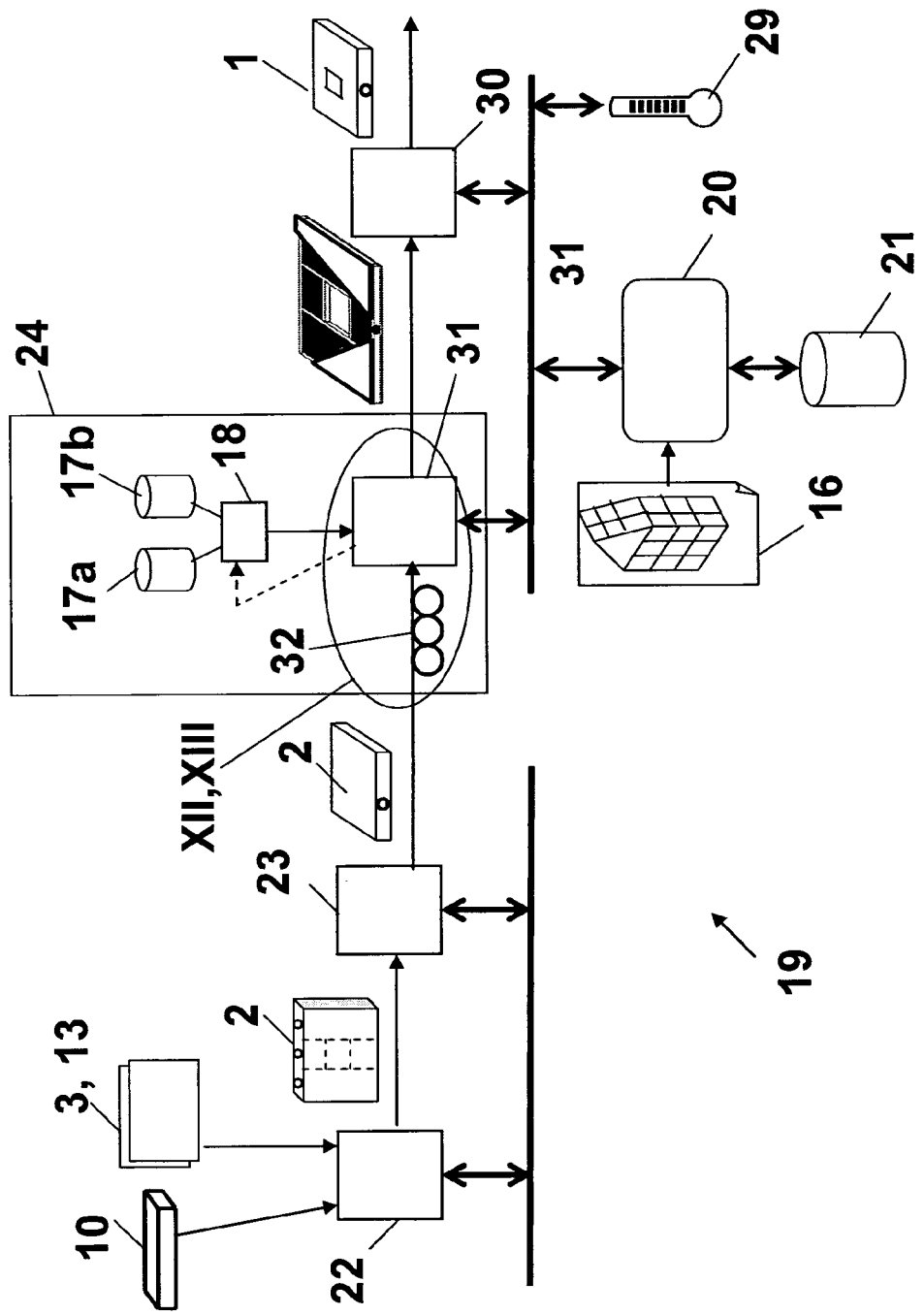
FIG. 11A shows a block diagram of a first preferred embodiment of a device according to the invention, directed at the substantially closed assembly, according to the method of FIG. 4A.
Figure 15A:
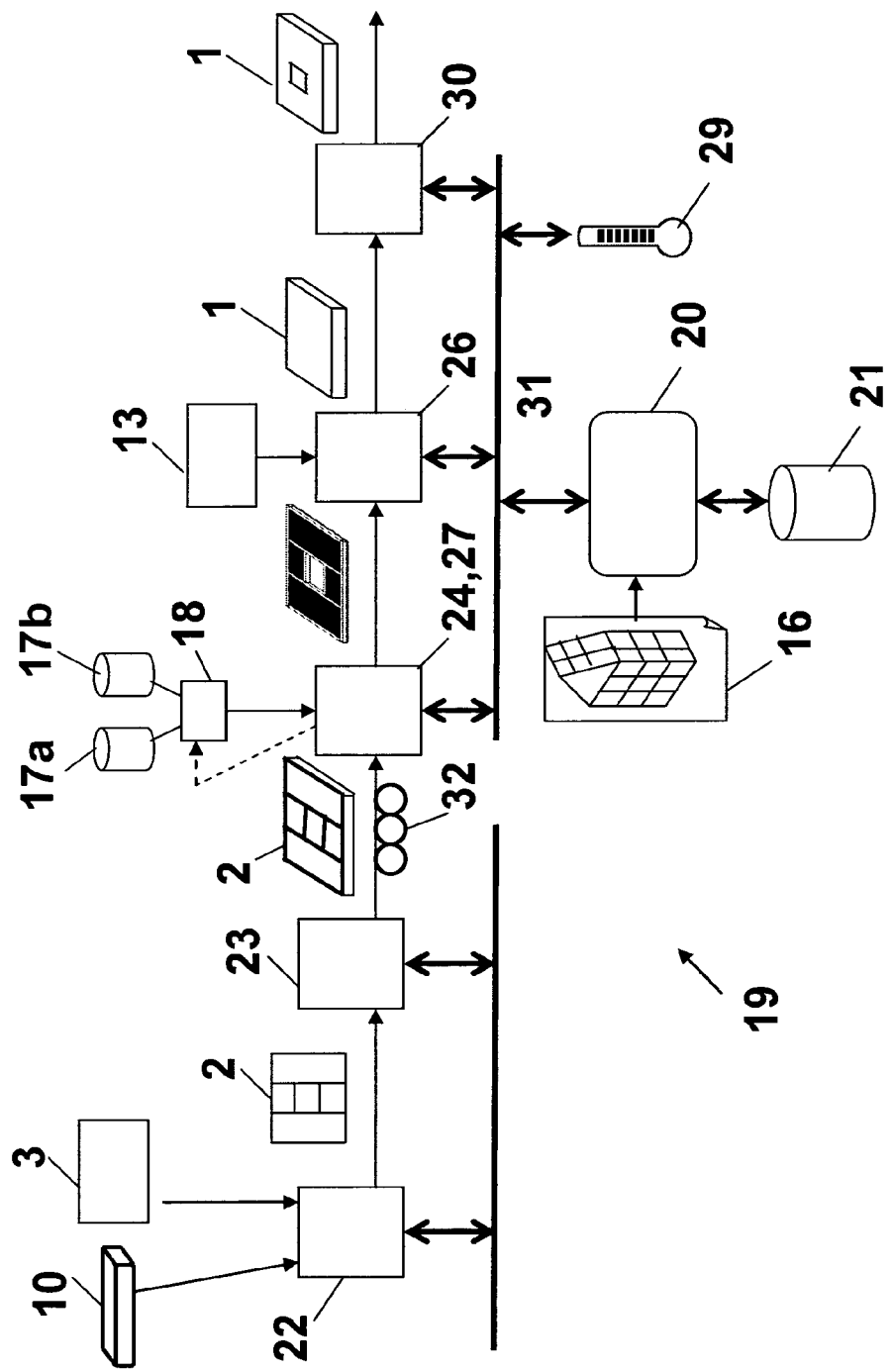
FIG. 15A shows a block diagram of a second preferred embodiment of a device according to the invention, directed at the half-open assembly, according to the method of FIG. 4A.

Step 102 is an optional step in which one or more assemblies 2 are temporarily stored or buffered. This is typically the case between an assembly unit 22 and a filling unit 24, since the time required for assembling and for filling with insulation is not the same. This also allows to adapt the sequence of the assemblies, if desired, e.g. for more optimum filling of the press. An example of a device 19 for implementing the method is illustrated in FIG. 11A and FIG. 15A, where assemblies 2 can be supplied in the middle of the figure (e.g. if the assembly unit 22 does not belong to the device 19), or can be manufactured internally (e.g. if the assembly unit 22 actually forms part of the device 19).

In an embodiment of the method according to the invention the predetermined thickness 15 may implicitly be the total thickness 9 of the frame. In this case the parameter of the desired thickness 15 of the insulation layer 8 may be omitted.

The data carrier 40 can be fitted manually or automatically to the assembly 2. The data on the data carrier 40 are however applied in an automated way by so-called identification means. Examples of these are a label printer (e.g. a matrix printer, laser printer, inkjet printer), a laser writer which writes directly onto the wood of the frame 4, an electronic or magnetic device which writes to a memory card, etc. The data carrier 40 may also be used for loading and unloading, to avoid errors in transport to the site, and on the site to simplify assembly of the building.

In an example of the method according to the invention one single data carrier 40 is fitted to the assembly 2 with data of all the compartments 5 to be filled of the assembly 2. This is particularly practical for a fully automatic filling unit 24, which displaces the nozzle 25 itself in or over all the compartments 5 to be filled. In this case step b) is only carried out once for the entire assembly 2, and steps c) and d) are carried out as frequently as there are compartments 5 to be filled.

In another example a plurality of data carriers 40 can be fitted to the assembly 2, e.g. as many as there are compartments 5 to be filled. This is particularly practical for a semi-automatic filling unit 24, wherein an operator displaces the nozzle 25 into or above each compartment 5 to be filled, but whereby the quantity of raw materials is calculated by the filling unit 24 on the basis of the data on the data carrier 40.

Preferably in this case as many data carriers 40 are fitted as there are compartments 5 to be filled, and they are preferably fitted in the vicinity of the compartments 5 to be filled (e.g. near opening 11 in case of a closed assembly 2). In this example the steps b), c) and d) are carried out as frequently as there are compartments 5 to be filled. An advantage of this method is that existing filling units 24 with minimum adaptations and costs can be converted to a device 19 according to the present invention, without having to provide expensive positioning means 41, 42 for automatic displacement of the nozzle 25, as well as the corresponding complex control (hardware and software).

The insertion of the determined quantity of raw materials may, for example, be carried out by accurately controlling the time during which the raw materials are being inserted (i.e. the so-called "filling time". The time t required may, for example, be calculated by means of the following formula:

$$t = V \times G \times O / F \quad [1],$$

where
  *V=the volume of the foam insulation layer 8 to be applied,
    e.g.: L×B×thickness of the frame (ref. "9") for a beam-shaped compartment 5 of a closed assembly 2,
    e.g.: L×B×thickness of the foam insulation layer 8 (ref. "15") for a beam-shaped compartment 5 of a half-open assembly 2,
  G=the freely foamed weight of the insulation foam,
    e.g. approx. 30 kg/m³ for polyurethane foam,
  O=the overfilling of the insulation foam,
    e.g. 1.00 for 0% overfilling in a half-open assembly 2
    e.g. 1.05 for 5% overfilling in a closed assembly 2
  F=the set flow rate of supply station 18 (in gram/sec.)

Formula (1) may be used, for example, at constant component temperatures of e.g. 20° C., and a volumetric pressure of between 120 and 150 bar.

Figure 4B:
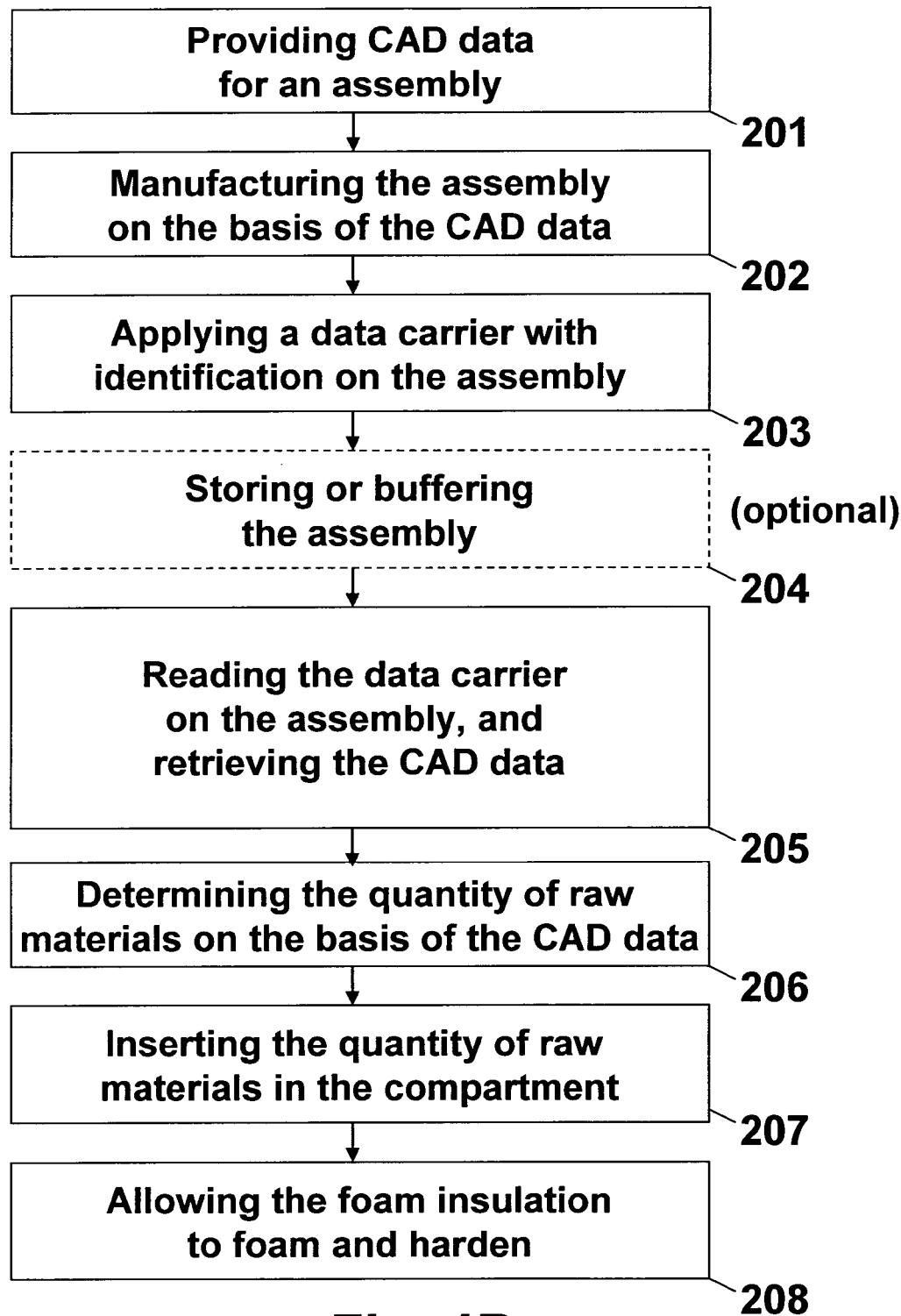
FIG. 4B shows an example of the method according to the invention in which the same CAD data is used by both an assembly-unit and a filling unit. This method can be implemented on the device of FIG. 11B.

FIG. 4B shows an example of an integrated method according to the invention, starting from a plan 16 of a building to be constructed, the method comprising the steps of: a) providing a 3D computer model of the skeleton framing segment 1 in the form of CAD data, and storing it in a database 21 (step 201); b) the manufacture of an assembly 2 which comprises a frame 4 and a first flat panel 3 with specific dimensions corresponding to the CAD data, for forming the skeleton framing segment 1, the assembly 2 having at least one compartment 5 with a hollow space 14 (step 202); c) the fitting of a data carrier 40 with an identification on the assembly 2 to enable the corresponding CAD data to be identified (step 203); d) the reading of the data carrier 40 fitted to the assembly 2, and the retrieval of the CAD data of the assembly 2 from the database 21 (step 205); e) the determination of a quantity of raw materials which are to be inserted in the at least one compartment 5 of the assembly 2 for forming a foam insulation layer 8 with a predetermined thickness 15 from the retrieved data (step 206); f) the insertion of the determined quantity of raw materials in the at least one compartment 5 for forming the foam insulation layer 8 with the predetermined thickness 15 (step 207); g) allowing the foam insulation layer 8 to foam and harden in the at least one compartment 5 during a predetermined period T (step 208).

Figure 11B:
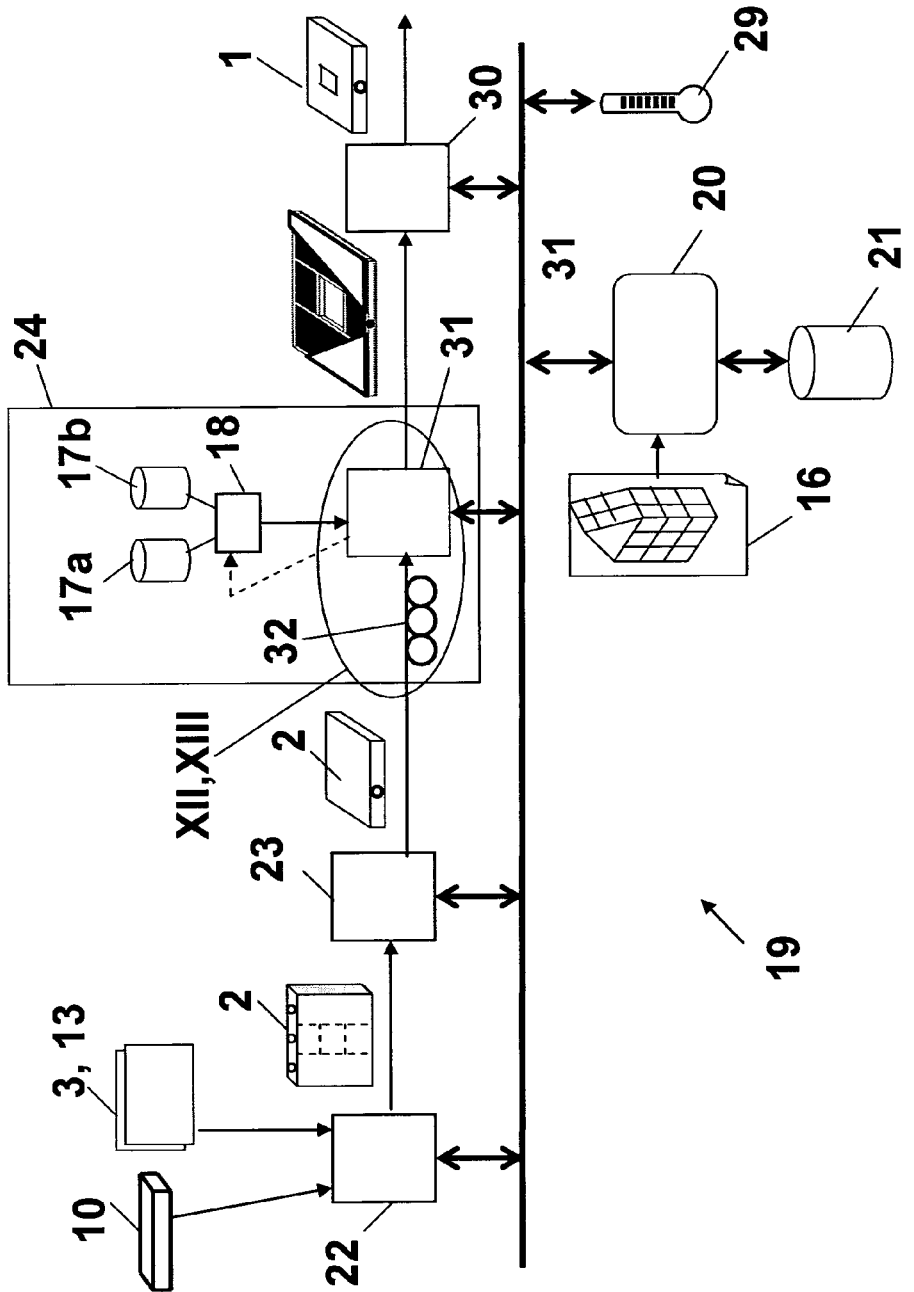
FIG. 11B shows a block diagram of a variant of the first preferred embodiment of a device according to the invention, directed at the substantially closed assembly, according to the method of FIG. 4B.
Figure 15B:
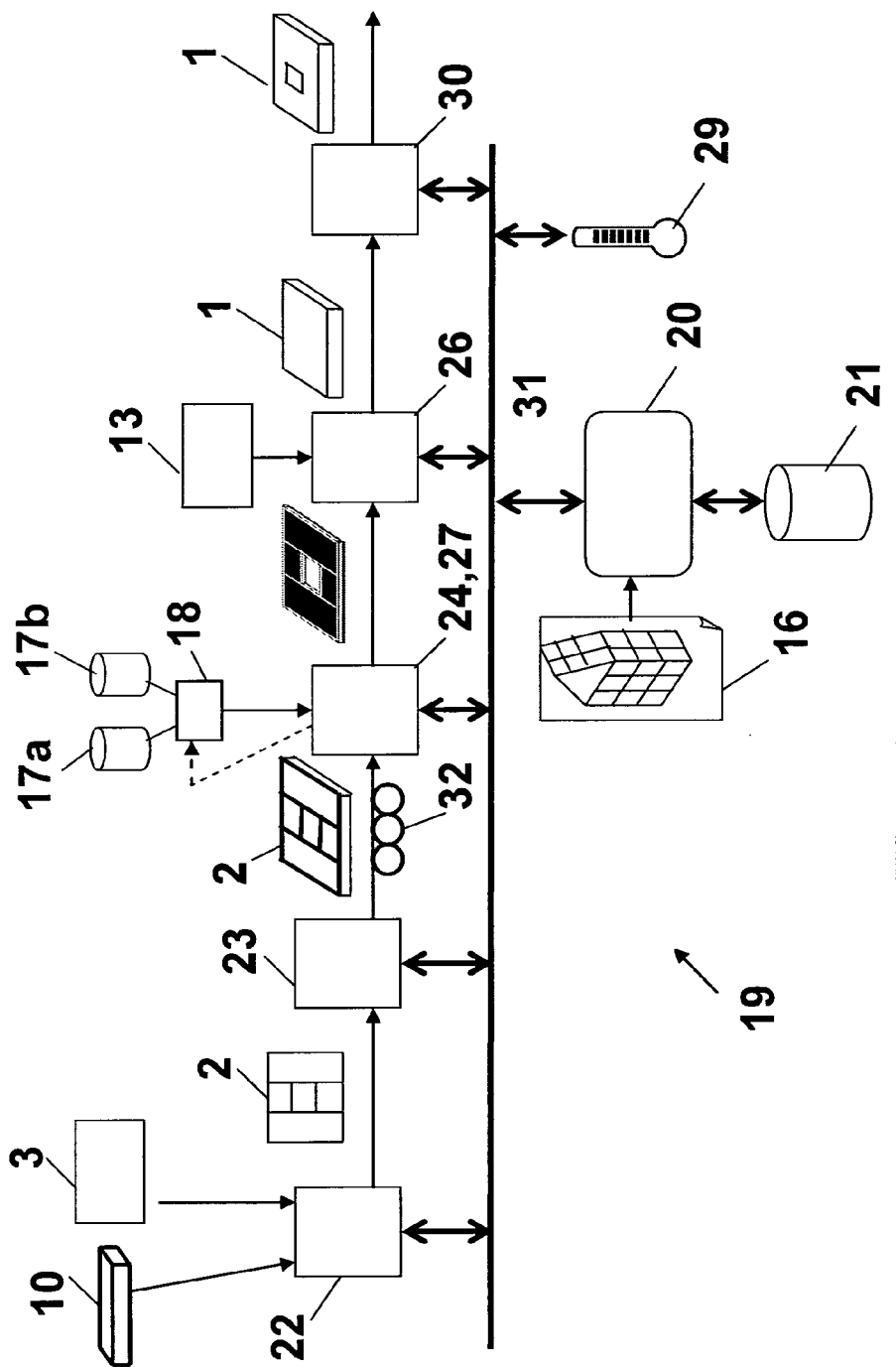
FIG. 15B shows a block diagram of a variant of the second preferred embodiment of a device according to the invention, directed at the half-open assembly, according to the method of FIG. 4B.

Step 204 is an optional step, similar to step 102 in FIG. 4A. An example of a device 19 for implementing this method is illustrated in FIG. 11B and FIG. 15B. In this example the assembly unit 22 and the filling unit 24 are preferably connected to the same database 21.

Step a) may include the conversion of a plan 16 of the building to be constructed to a 3D computer model, represented by CAD data for the building, as well as the partitioning of that computer model to individual skeleton framing segments 1, represented by CAD data for each skeleton framing segment 1. In the context of this patent publication the CAD data refers in most cases to the CAD data of one skeleton framing segment.

By using the same CAD data both for manufacturing the assembly 2 (in the assembly unit 22) and for its filling (in the filling unit 24), the production process can be largely automated and the risk of human error minimised. Such an advanced form of automation enables a sufficiently high production rate to be achieved to recoup the high investment costs of the installation. The result of the present invention is therefore a method and a device which supplies a high quality custom-made product at a reasonable price for the end user.

By identifying the assembly 2 and reading the data of the data carrier 40 (FIG. 4A) or retrieving them from the corresponding CAD data (FIG. 4B), the method according to the invention can be used for manufacturing skeleton framing segments 1, each with different dimensions, thus rendering the method extremely flexible and providing the architect of the building with enormous freedom in terms of dimensions and shapes. By determining as accurately as possible the quantity of raw materials to be inserted from the data, wasting of the raw materials is prevented. All compartments 5 of the same assembly 2 are generally filled with the same thickness 15 of insulation material 8, but this is not necessary. The method allows the thickness 15 of the insulation layer 8 to be different in each compartment 5, and even allows different raw materials to be used in the different compartments 5 to be filled. In some cases a fire-retardant component may be added, for example, and in other compartments 5 not.

The manufacture of the assembly 2 according to the CAD data in step b) preferably comprises the following steps: —providing a plurality of beams 10, and the sawing of the beams 10 to predetermined lengths; —the positioning of the beams 10 in a predetermined position and orientation in relation to each other;—the securing of the beams 10 to each other to form a frame 4;—providing a first flat panel 3 with dimensions W, H which correspond to those of the frame 4;—the securing of the first flat panel 3 to the frame 4.

Figure 2:
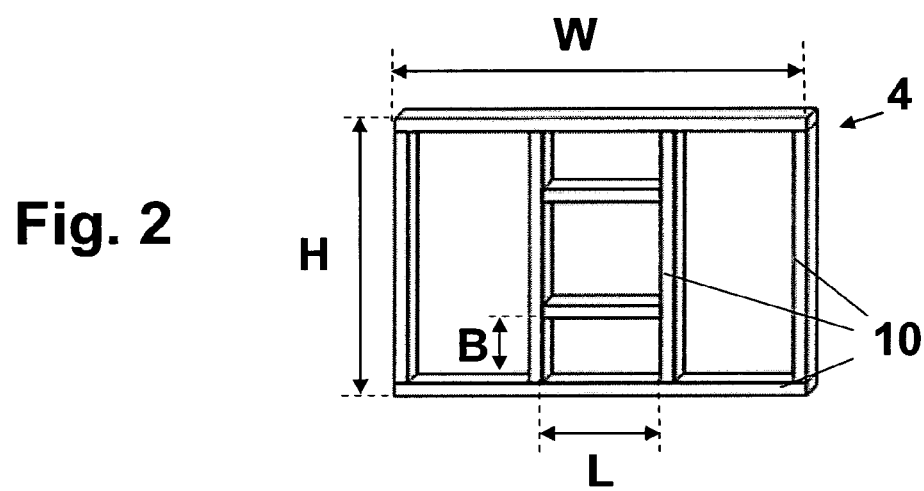
FIG. 2 shows a frame manufactured by the assembly unit using the beams of FIG. 1.
Figure 3:
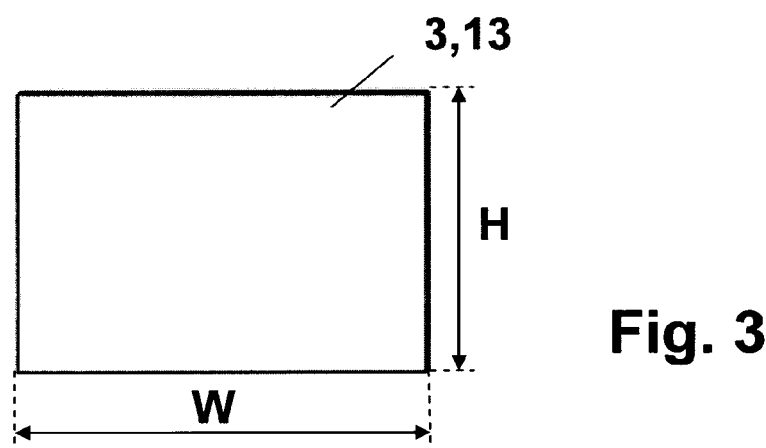
FIG. 3 shows a first or second flat panel for the frame of FIG. 2.

This is illustrated in FIG. 1-3. FIG. 1 shows a beam 10 which can be used for manufacturing the frame 4. The beam 10 may, for example, be an all-wood beam with a square or rectangular cross-section, but it may e.g. also be a hollow metal beam, e.g. of steel or aluminium. Generally the length of the beams 10 need to be adapted. This can be achieved by traditional methods, such as e.g. by sawing, or by another traditional method. The sawn beams 4 are secured to each other for forming a frame 4, as shown in FIG. 2. FIG. 3 shows the corresponding first and/or second flat panel 3, 13, which is secured to the frame 4, thereby obtaining the closed assembly 2 of FIG. 5A or FIG. 6A, or the half-open assembly 2 of FIG. 8A or FIG. 9A. Preferably the frame 4 is a wooden frame, because wood has a relatively high compressive and tensile strength, and because wood is a poor conductor of heat, thus avoiding cold bridges between the first and second flat panel 3, 13. Moreover, wood has pores to which the foam insulation material 8 is able to adhere firmly. An advantage of a metal frame is that it is stronger and stiffer than wood for same dimensions. Metal can also offer structural strength for a longer time in case of fire. The securing of the beams 10 to each other, and the securing of the first and second flat panel 3, 13 to the frame 4 may, for example, be carried out using nails, or by stapling, or by screwing, or by welding or by gluing, or by any other method known to the person skilled in the art.

Example 1 Method with a Closed Assembly

A first preferred embodiment of the method according to the invention is illustrated by means of FIGS. 5A-7D and an example of a device 19 for implementing this method is illustrated in FIGS. 11-14.

Figure 5A:
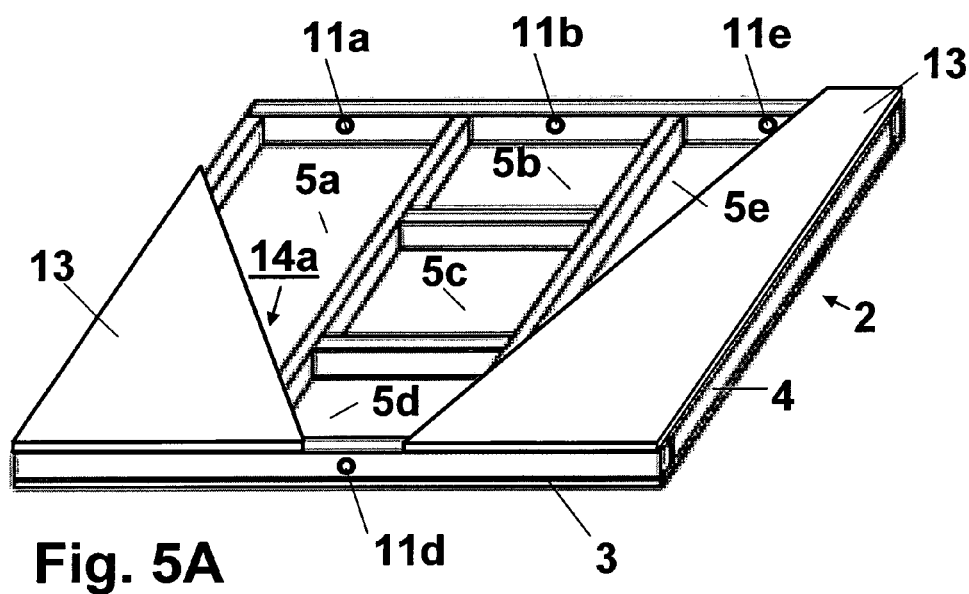
FIGS. 5A-5C show an intermediate product and an end product obtained by a first preferred embodiment of the method according to the present invention.
Figure 5B:
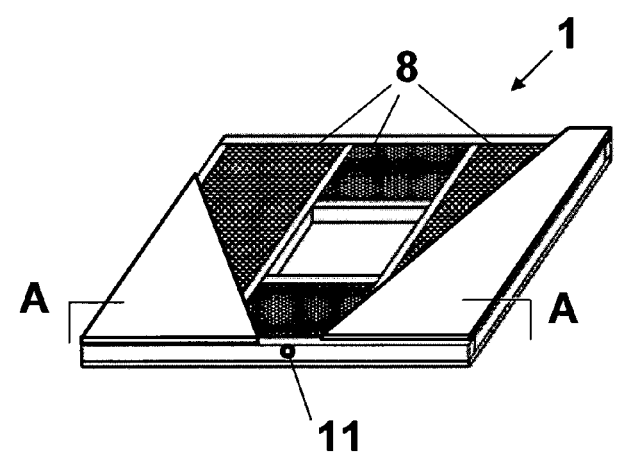
Figure 5C:
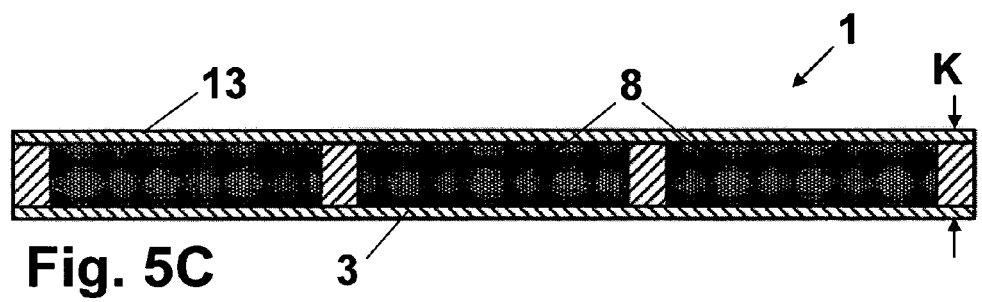

FIGS. 5A-5C show an assembly 2 as an intermediate product, and a pre-insulated skeleton framing panel 1 as the end product of a first preferred embodiment of the method according to the invention. Here the starting point is a substantially closed assembly 2 which comprises a first and a second flat panel 3, 13, secured to a frame 4 which is located between the two flat panels 3, 13. This assembly 2 is shown in FIG. 5A, in which part of the second flat 13 plate is not drawn for illustrative reasons. The assembly 2 is preferably placed in a lying position, preferably horizontal. The assembly 2 has at least one compartment 5, in most cases a plurality of compartments 5, which form hollow spaces 14. To provide access to each compartment 5 that needs to be filled with a foam insulation layer 8, in this case these are compartments 5a, 5b, 5d and 5e, an opening 11 is provided towards each compartment to be filled. The assembly 2 is preferably provided with predrilled holes 11, otherwise the method further comprises the step of making an opening 11 in assembly 2 to allow the raw materials to be inserted in the at least one compartment 5. These openings 11 should preferably be made in the frame 4 (and not in the flat panels), since the frame 4 is no longer visible when the skeleton framing panel 1 is installed in the building, and because this location is more easily accessible when the assembly 2 is located in a press 31, as will be further explained in the discussion of FIG. 11-14. Optionally the openings 11 may already have been made in the frame 4 before the flat panels 3, 13 are secured to it. It is even possible to provide the openings 11 already in the beams 10 before they are joined together to form the frame 4. Since the compartment 5c in this example (FIG. 5A) is designed for a window opening 50, it will not be filled with a foam insulation layer 8. Compartment 5d should therefore have a separate opening 11d which in this case is located on the opposite side of the other openings 11a, 11b, 11e. According to the invention the quantity of raw materials for each compartment 5 is precisely calculated on the basis of the dimensions L, B, 9 (see FIG. 2 and FIG. 6C) and the shape of that compartment 5 (in this case rectangular). In practice this means to determine the volume of the space to be filled, multiplied by a constant which is dependent on the insulation material. If desired, this quantity is further corrected with an over-filling of e.g. 0.5% or 1.0% or 1.5% or 2.0% or 5% of 10% or more, in order to minimise the risk of residual hollow spaces after foaming. The use of over-filling is optional. The larger the over-filling the larger the pressure on the flat panels 3, 13 and the more powerful the press 31 must be.

The shape of the compartments 5 is preferably triangular or rectangular, but other shapes are also possible. The calculated quantity of raw materials is then inserted in each of the compartments 5a, 5b, 5d, 5e to be filled, preferably by injecting the raw materials into them under high pressure (e.g. a pressure of over 100 bar). The raw materials will then foam and harden. In the case of PU foam (also abbreviated as PUR or PU) foaming takes place very quickly, e.g. typically of the order of 10-30 seconds, but the hardening generally requires much more time, e.g. typically of the order of 15-60 minutes. During foaming and hardening the foam insulation material 8 exerts an outwardly directed force on the first and second flat panel 3, 13, which are to be retained externally to counteract loosening of the plates 3, 13. In practice the closed assembly 2 is therefore placed in a clamping table or press 31, as will be explained in connection with FIG. 12-14. The compressive forces are preferably maintained as long as a substantial expansion of the foam insulation material 8 is still taking place. The press 31 prevents, among other things, the flat panels 3, 13 from being pushed away from the frame 4, or the outermost beams 10 from being displaced outwards between the flat panels 3, 13.

FIG. 5B shows the assembly 2 after the foaming and hardening of the foam insulation layer 8 in a perspective view, but a part of the second flat panel 13 is not drawn for illustrative reasons.

FIG. 5C shows a cross-section of the assembly 2 of FIG. 5B in the plane A-A.

Figure 6A:
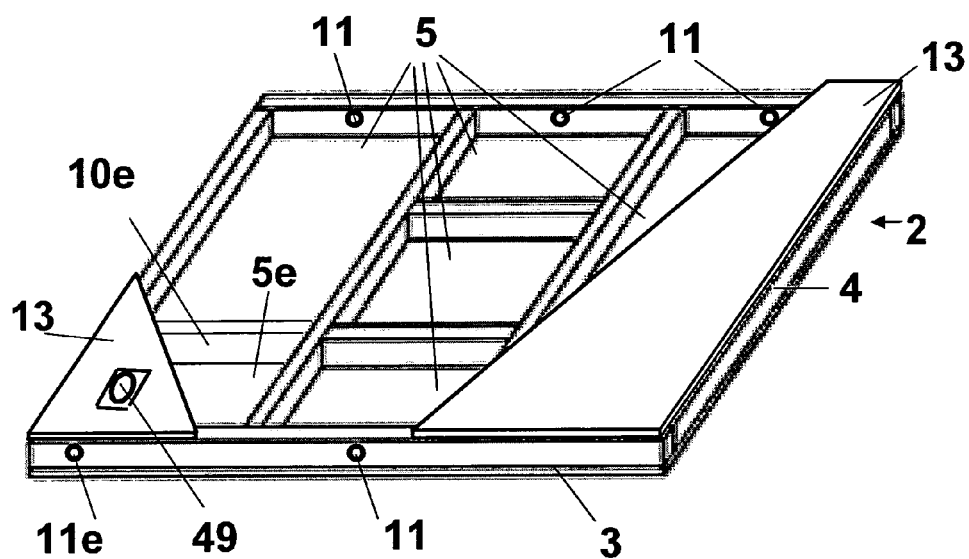
FIGS. 6A-6C show a variant of FIGS. 5A-5C, wereby a socket is installed in the second panel.
Figure 6B:
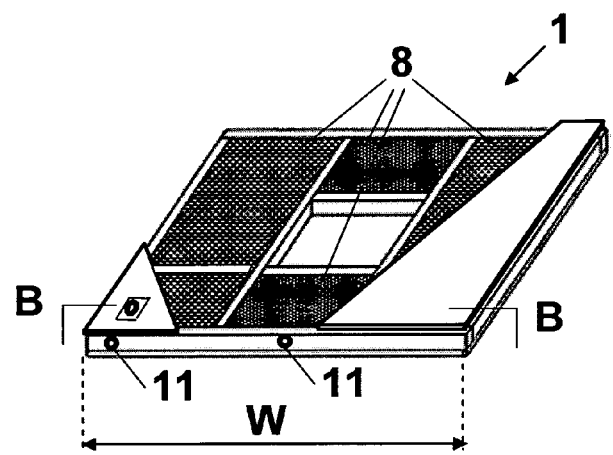
Figure 6C:
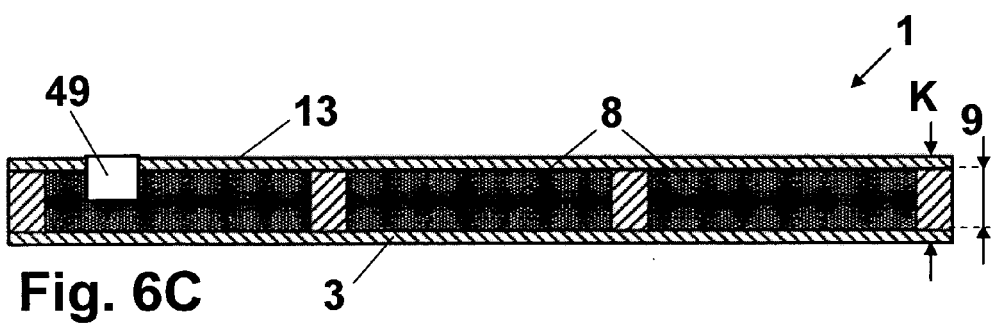

FIGS. 6A-6C illustrate a variant of the first preferred embodiment of the method according to the invention, whereby one or more compartments 5, with the corresponding hollow spaces 14, are also being partially used for installing technical devices (e.g. electrical cables or water pipes) which are traditionally fitted to an outside of the second flat panel 13 and where, in the traditional method, a third flat panel (not shown) is added to the assembly 2 to create a cavity when a complete airtight structure is desired. According to the present invention however such third flat panel is avoided, so that material costs are saved, and the skeleton framing segment takes up less useful space. Moreover, by installing the technical devices between the first and second flat panel 3, 13, a monolithically pre-insulated skeleton framing segment 1 can be obtained, which is fully finished. This is possible when an airtight foam insulation material 8 is used, such as e.g. polyurethane foam. FIG. 6A show an example of such a skeleton framing panel 1, but part of the second flat panel 13 is not drawn for illustrative reasons. In this skeleton framing segment 1 a socket 49 is installed against the second flat panel 13 in a position which corresponds to compartment 5e. Of course, a plurality of sockets 49, e.g. two or three or more, may be installed in the same compartment 5e or in another compartment. If the frame 4 has a thickness 9 of e.g. 17 cm, and if socket 49 has a thickness of e.g. 7 cm, there is a remaining thickness of 10 cm for the foam insulation layer 8 behind the socket 49, but other dimensions are of course also possible. Preferably special fire-resistant hollow-wall sockets are used which operate in a flame-retardant manner. Preferably a known fire-retardant component is therefore added to the raw materials in this compartment 5e to reduce the risk of the outbreak or spread of fire. This is not only of interest to detached houses, but particularly to apartment buildings and hospitals, where a higher degree of fire safety is required, as laid down in standards. Such a fire-retardant component can be installed in all compartments 5, or only in the compartments where also electrical devices are housed, since the risk of fire outbreak is greatest there, e.g. because of a short-circuit, and because a fire-retardant component is generally relatively expensive. For this purpose the assembly 2 of FIG. 6A is provided with a separate compartment 5e so that not the entire compartment 5a of FIG. 5A needs to be filled, but only part of it: compartment 5e of FIG. 6A. This can simply be achieved by the addition of an extra beam 10e. Other topologies are of course also possible, for example the compartment 5e may also extend over the full length W of the skeleton framing panel 1, which is convenient for leading through electrical or other cables or lines from one skeleton framing panel 1 to another.

FIG. 6B shows the assembly 2 of FIG. 6A (where again part of the second flat panel 13 is removed for illustrative reasons) after filling the compartments 5 not having electrical devices with first raw materials excluding a fire-retardant component, and filling the compartment 5e with second raw materials, including a fire-retardant component.

FIG. 6C shows a cross-section of the closed assembly 2 of FIG. 6B, according to section B-B.

Figure 7A:
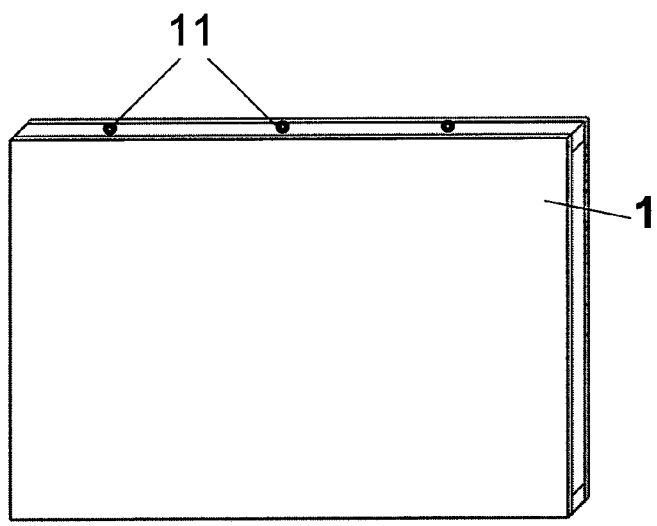
FIG. 7A shows the skeleton framing segment of FIG. 5C in perspective, before an opening is made for a window.
Figure 7B:
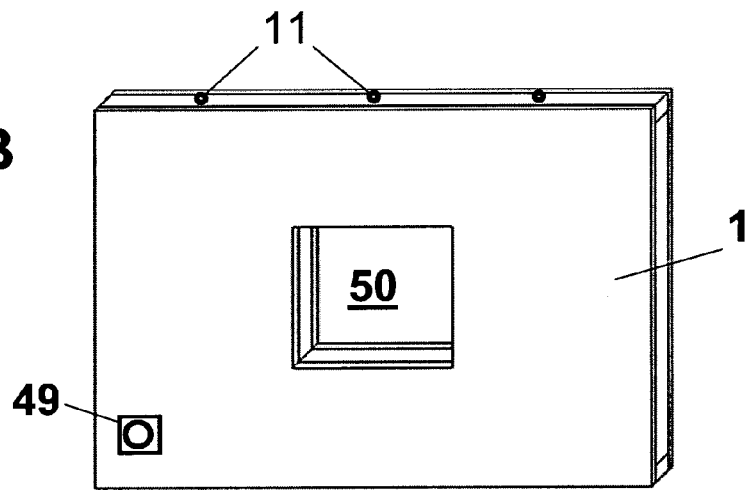
FIG. 7B shows the skeleton framing segment of FIG. 6C after an opening is made for a window.

FIG. 7A shows the skeleton framing segment 1 according to FIG. 5A in a perspective view, before opening 50 is made for the window. FIG. 7B shows the skeleton framing segment 1 according to FIG. 6C in a perspective view after the opening 50 for the window is made. Note that both skeleton framing panels 1 are attractively finished, and that the openings 11 are located in the frame 4 at a position which will not be visible when the skeleton framing panel 1 is placed in the building.

Figure 7C:
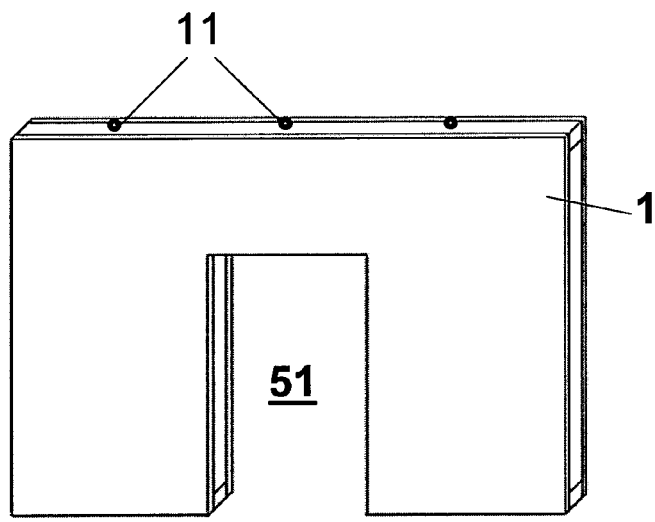
FIG. 7C shows a variant of the skeleton framing segment of FIG. 7A, the skeleton framing segment having a door opening.
Figure 7D:
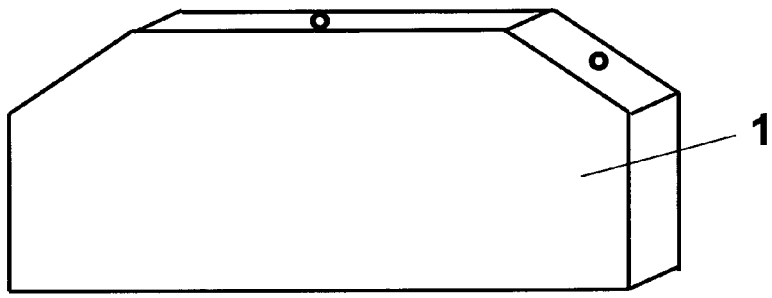
FIG. 7D shows a variant of the skeleton framing segment of FIG. 7A, the skeleton framing segment having inclined walls.

Other shapes and dimensions of skeleton framing panels 1 are of course also possible. FIG. 7C, for example, shows a skeleton framing segment 1 with an opening 51 for a door, and FIG. 7D shows, for example, a skeleton framing panel 1 with two inclined edges as a wall for an upper floor of a building, but other shapes are also possible.

Example 2 Method with a Half Open Assembly

Figure 16:
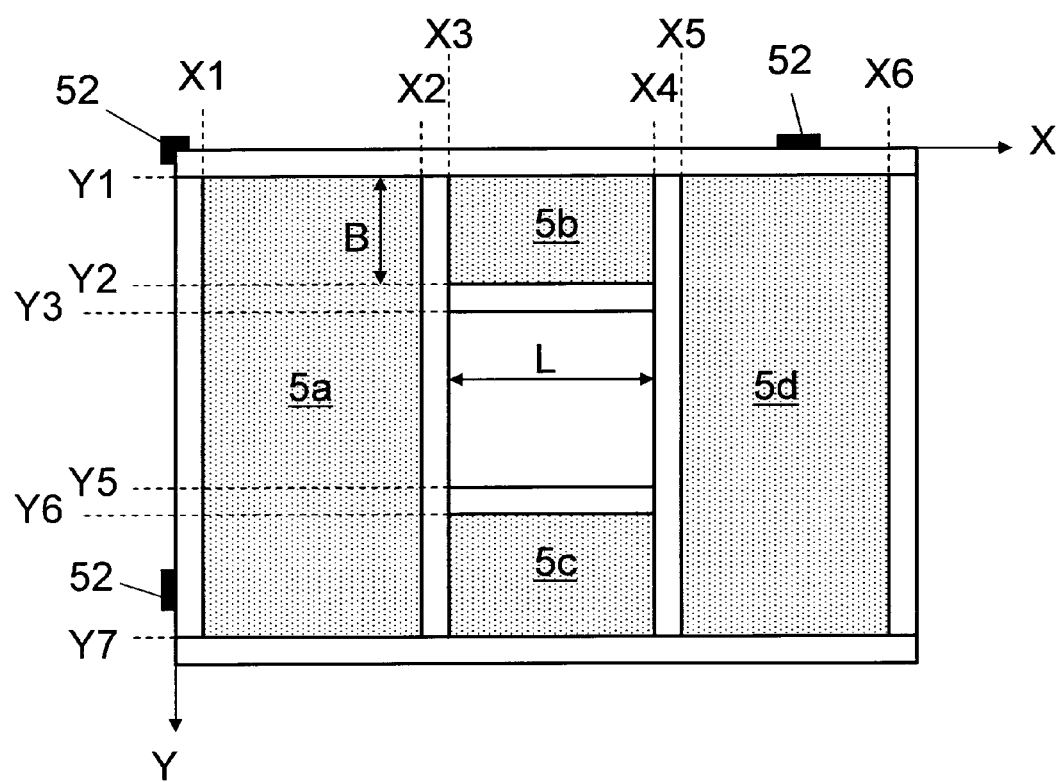
FIG. 16 shows an example of a half-open assembly with an indication of the positions of the compartments to be filled.

A second preferred embodiment of the method according to the invention is illustrated by means of FIGS. 8A-10D and an example of a device 19 for implementing this method is illustrated in FIGS. 15-16.

Figure 8A:
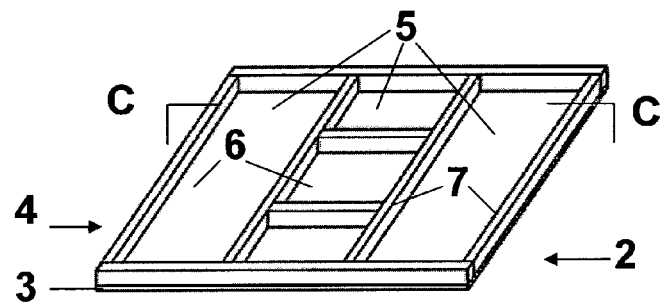
FIGS. 8A-8C show an intermediate product and an end product obtained by means of a second preferred embodiment of the method according to the present invention, the thickness of the insulation layer being 25% of the thickness of the frame.
Figure 8B:
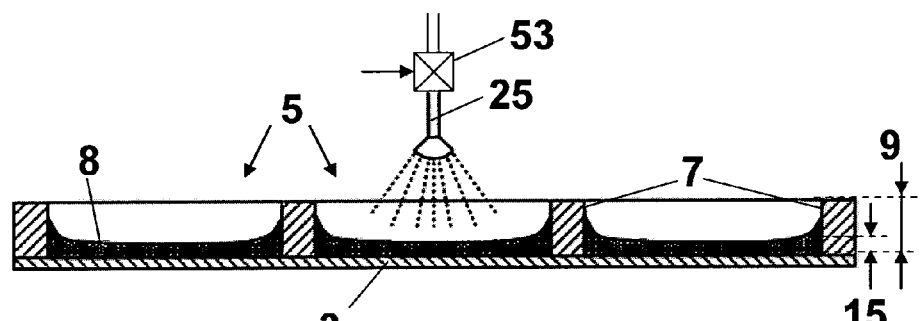
Figure 8C:
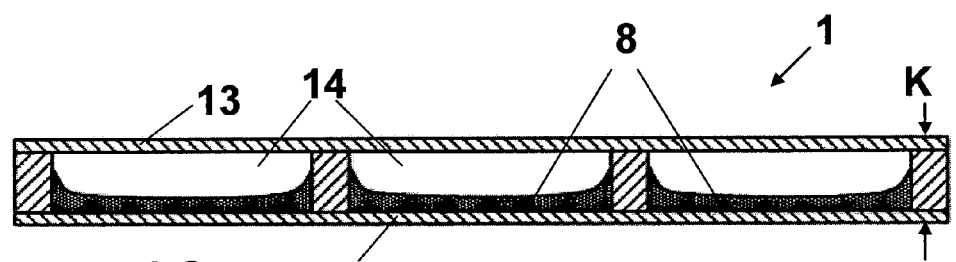

FIGS. 8A-8C show an assembly 2 as an intermediate product and a pre-insulated skeleton framing segment 1 as the end product obtained by means of a second preferred embodiment of the method according to the present invention, whereby the thickness 15 of the foam insulation layer is approximately 25% of the thickness 9 of frame 4.

In FIG. 8A the starting point is a half-open assembly 2 with a first flat panel 3 secured to a frame 4. This assembly 2 is placed in a lying position, preferably horizontal. The assembly 2 has at least one compartment 5, in most cases a plurality of compartments 5, whereby the first flat panel 3 forms a bottom, and the beams 10 of the frame 4 form upright walls 7. According to a second preferred embodiment of the method of the invention the compartments 5 are to be filled at least partially with a foam insulation material 8 of a desired thickness 15. For this purpose the quantity of raw materials to be inserted to form the foam insulation layer 8 is calculated on the basis of the dimensions B, L and the shape of the compartment 5, as well as the predetermined desired thickness 15 of the foam insulation layer 8 to be inserted corresponding to the plan 16 or the specification of the building to be constructed. In FIG. 8B this desired thickness 15 is approximately 25% of the thickness 9 of the frame 4, but the predetermined thickness 15 may be any thickness from 1% to 100%, e.g. 1%, 5%, 10%, 20%, 30%, 40%, 50%, 60%, 70%, 80%, 90%, 95%, 100%.

The raw materials for the foam insulation layer 8 are preferably inserted through a nozzle 25, which in FIG. 8B takes the shape of a spray nozzle 25 which applies the raw materials to the bottom 6 and to the upright walls 7, as well as in the corners of the compartment 5 to be filled, e.g. by injecting or spraying. In practice a plurality of spray nozzles 25 positioned one next to each other may be used simultaneously when filling one compartment 5, and a plurality of components 5 may be filled simultaneously. In order to control the quantity of raw materials being inserted, each spray nozzle 25 is preferably fitted with a flap or valve 53 which is controlled by the computer system 20 of the filling unit 24. According to the invention the quantity of raw materials which is inserted in one compartment 5 is accurately determined, and the spray nozzles 25 are displaced over or above the assembly 2 in such a way, and the quantity of raw materials is regulated in such a manner that the thickness 15 of the foam insulation layer 8, after foaming and hardening, optimally corresponds to the desired thickness 15. After the foam insulation material 8 has sufficiently foamed, the second flat panel 13 can be fitted and secured to the assembly 2, as shown in FIG. 8C.

Note that in this method the foam insulation material will only adhere to the first flat panel 3, but not to the second flat panel 13, which means that the mechanical strength will be less than that of the skeleton framing segment 1 obtained with the closed assembly. Nevertheless this is an interesting alternative since it can be manufactured more quickly and cheaply, and no press 31 is required. Optionally the hollow space 14 in some compartments 5 can also partially be used here for installing technical devices such as electrical cables or water pipes, in the same way as described above. By positioning these devices on the inside of the skeleton framing segment 1, an external construction and finish are superfluous and mounting costs and material can be saved. In this way again a monolithic pre-insulated skeleton framing segment 1 can be obtained.

Figures 9A, 9D:
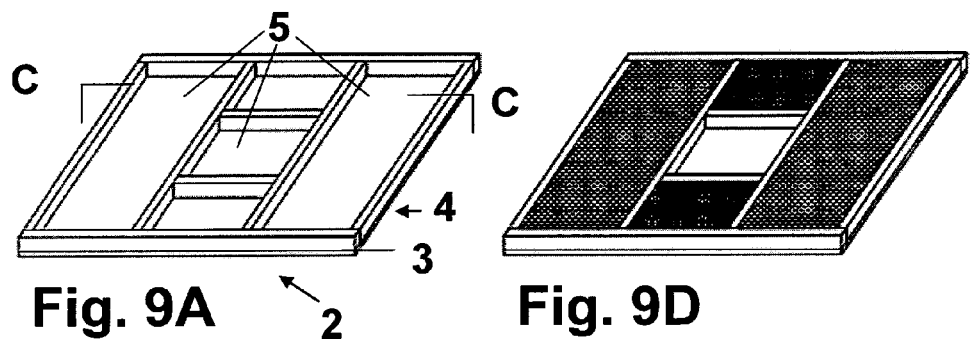
FIGS. 9A-9E show some intermediate steps of a second preferred embodiment of the method according to the present invention, the desired thickness of the foam insulation layer being equal to the thickness of the frame.
Figure 9B:
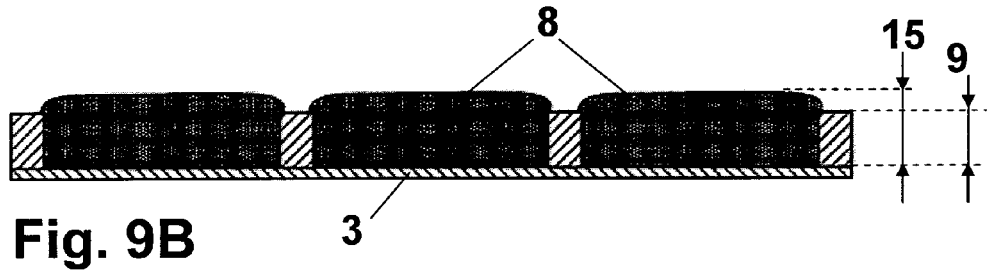
Figure 9C:
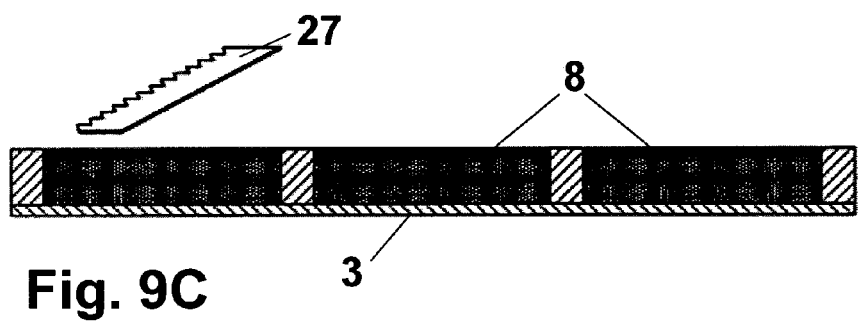
Figure 9E:
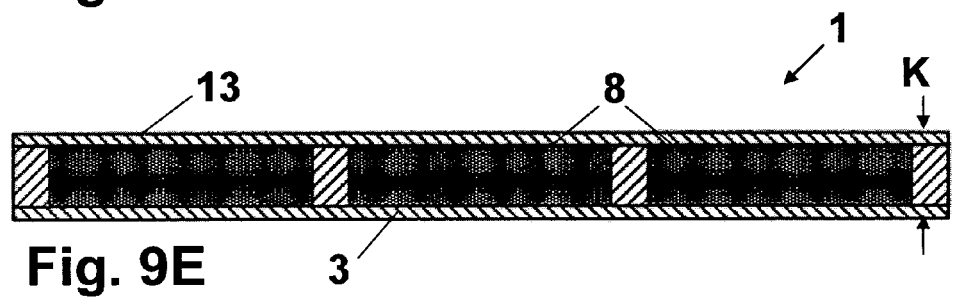

A variant of the second preferred embodiment of the method according to the invention is illustrated in FIG. 9A-9E. Also in this case the starting point is a half-open assembly 2, shown in FIG. 9A. In this embodiment the desired thickness 15 of the insulation material is 100% of the thickness 9 of the frame 4, i.e. the maximum insulation for a given frame thickness 9. Since there will unavoidably be tolerances on the actual height of the foamed insulation material 8, the quantity of raw material 8 in this embodiment is chosen so that the foam insulation layer 8 projects at all points above the upright wall 7 of the compartment 5 (FIG. 9B), preferably just above this upright wall 7. After foaming and hardening, the projecting part is removed, e.g. by cutting or sawing (FIG. 9C and FIG. 9D). By using the method according to the invention the desired value of 100% material use is approached as closely as possible, so that as little foam insulation material 8 as possible has to be cut away, and so that as few raw materials as possible are wasted. The second flat panel 13 can then be applied and secured to the assembly 2, as shown in FIG. 9E. Note that the removal of the excess foam 8 was not necessary in FIG. 8B because the thickness 15 there was considerably less than 100%, whilst removal is necessary when the desired thickness 15 approaches 100%. In this example the central compartment 5 is once again not filled with a foam insulation layer 8 because this compartment 5 is intended to serve as opening 50 for a window (see FIG. 10B). The filling unit 24 will automatically skip this compartment 5 during filling, by reading the data carrier 40 fitted to the assembly 2, as described above.

To optimise the method of FIG. 9A-9E even further, the actual thickness 15 of the foam insulation layer 8 is optionally measured, preferably in a plurality of places. This may for example be achieved by using a light sensor, whereby the light beam e.g. parallel to the first flat panel 3 is displaced in height direction in order to determine the maximum height of the foam insulation layer 8, or by using a row of light sensors placed above each other, but other means known to the person skilled in the art may also be used, e.g. one or more 3D cameras.

Figure 10A:
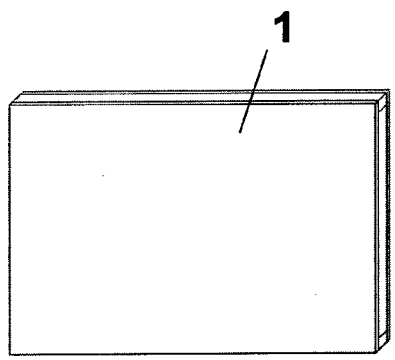
FIG. 10A shows the skeleton framing segment of FIG. 8C or 9E in perspective, before an opening is made for a window.
Figure 10B:
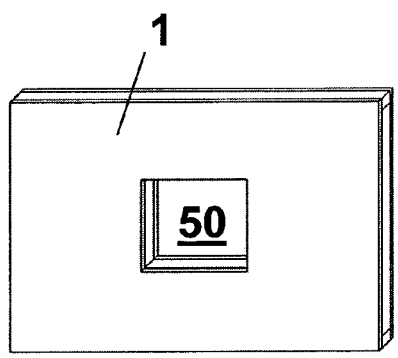
FIG. 10B shows the skeleton framing segment of FIG. 10A after an opening has been made for a window.

FIG. 10A shows the skeleton framing segment 1 of both FIG. 8C and FIG. 9E in a perspective view before the opening 50 is made for the window, and FIG. 10B after the opening 50 is made for the window.

Note that in both preferred embodiments of the method according to the invention the opening 50 for a window or 51 for a door can also be made in advance in the first and second flat panels 3, 13, before they are secured to the frame 4. The presence of this opening 50, 51 presents no problem for inserting insulation material 8 during filling since the compartment (or compartments) 5 corresponding to the opening 50, 51 are not filled with insulation material 8 anyway. It may be an advantage to make these openings 50, 51 in the flat panel 3, 13 beforehand, because this eliminates the risk of damaging the frame 4 when making the opening 50, 51, e.g. by means of a circular saw.

Note that it cannot be seen from the outside of the skeleton framing panel 1 (FIG. 10A-10D); how thick the applied foam insulation layer 8 actually is. Note that this skeleton framing panel 1 is attractively finished, and has no openings 11 through which the raw materials were inserted, which again provides an aesthetic advantage over traditional panels.

Figure 10C:
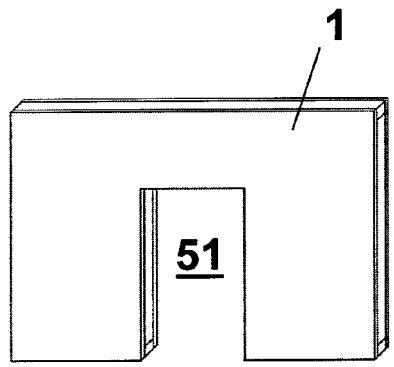
FIG. 10C shows a variant of the skeleton framing segment of FIG. 10B, the skeleton framing segment having a door opening.
Figure 10D:
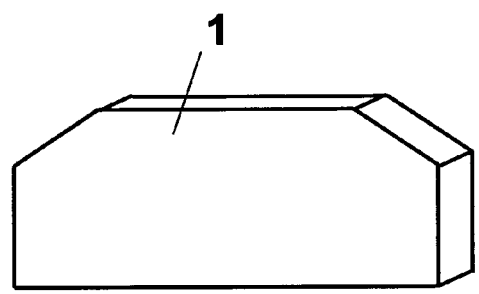
FIG. 10D shows another variant of a skeleton framing segment of FIG. 10A, the skeleton framing segment having inclined walls.

Other shapes and dimensions of skeleton framing panels 1 are of course also possible. For instance, FIG. 10C shows a skeleton framing segment 1 with an opening 51 for a door, and FIG. 10D, for example, shows a skeleton framing segment 1 with two inclined edges as a wall for a top floor of a building. Other shapes and dimensions are of course also possible, and the same applies of course to the frame 4 and the corresponding flat panels 3, 13 thereof.

General

Although the invention also works for other kinds of foam insulation material 8, a polyurethane-foam insulation is preferably used. It is due, in particular, to the high degree of automation that the use of a high quality and relatively expensive insulation material such as polyurethane is possible. Moreover, by applying the raw materials for the polyurethane in liquid form (in contrast to pre-foamed polyurethane boards), the polyurethane can foam in the assembly 2, thus achieving good mechanical adhesion to the first flat panel 3, and in the case of a closed assembly 2 also to the second flat panel 13, which benefits the mechanical properties of the skeleton framing panel 1. Polyurethane has the advantage of a relatively low specific mass (typically 40 kg/m$^3$), a high thermal insulation value (lambda value of approximately 0.023 W/mK) and a high mechanical strength, particularly if a hard polyurethane foam is used. The long hardening time (typically 15 to 45 minutes) on the other hand renders the process more expensive, and a filling unit 24 combined with a fully automatic assembly unit is not a logical combination in this sense either. Polyurethane foam is usually applied by means of a supply station 18 with two high pressure adaptable injection pumps (not shown), preferably connected to the computer system 20 of the filling unit 24. Each injection pump is connected to a tank, one tank containing a polyol and the other tank containing an isocyanate. The components are mixed in the nozzle 25. Such high pressure injection systems are commercial available, and therefore need not be described in further detail. In the context of the present invention the raw materials, e.g. polyol and isocyanate, are preferably applied (e.g. injected) in the liquid condition. If desired, this foam can be made fire-retardant by adding known substances to the raw materials. Other additives may also be added, e.g. reaction retarders for postponing the reaction between the components (e.g. up to 20 seconds), so that they can first spread out over the bottom 6 before chemically reacting and foaming. The use of such additives is known in the literature. An additional advantage of PUR is that its insulation value does not or hardly degrades over time as a result of undesirable sagging, as is often the case with soft insulation material such as glass wool or rock wool, particularly when it becomes moist. Or viewed differently, PUR allows a thinner wall (smaller value K in FIG. 9E) to be obtained with the same mechanical strength and insulation value than a traditional skeleton framing panel 1 because of its high insulation value. As a result, material costs (thinner beams 10, lower raw material costs) and transport costs (more panels fit on 1 truck) are saved. Note that PIR (polyisocyanurate) is a special form of PUR, and is therefore also very well suited for use as an insulation material.

However, the invention will also work with another foam insulation material, such as e.g. another insulation foam with a closed cell structure or an open cell structure. An insulation foam with a closed cell structure is preferred in this case because it has a higher insulation value and is therefore better suited for passive apartments. Because of this, the use of a traditional foil, which must make the wall airtight and vapour-tight, can be avoided. An insulation foam with an open cell structure is generally cheaper, but is not diffusion tight.

Data carrier 40 is preferably a label (e.g. printed with an alphanumerical sequence), a 1D barcode or a 2D barcode, a component with a magnetic memory, a component with an electronic memory, an RF-ID chip or another data carrier 40 known to the person skilled in the art.

As far as materials are concerned, the skeleton framing segment 1 is preferably a wooden skeleton framing segment, the first flat panel 3 being manufactured from wood or plaster fibreboard to which a wooden frame 4 is secured.

Wood and plaster fibreboard are materials which are ideally suited for use in this application since they have a high degree of strength and because their pores allow good adhesion to the foam insulation material 8. Optionally the surface of the flat panel 3, 13 can be made rougher in order to increase the adhesion, e.g. by sandblasting the flat panel 3, 13, However, a hard flat panel from a different material considered suitable by the person skilled in the art, may also be used, e.g. a hard flat pressed insulation panel.

Preferably the method according to the invention further comprises the step of heating the raw materials before or during their insertion in the at least one compartment 5, preferably under the control of the computer system 20. By accurately setting the temperature of the raw material, on the one hand, the process parameters can be controlled more precisely, and the calculation of the required quantity of raw materials will be more accurate, resulting in even less loss of raw material. On the other hand, the foaming and hardening can be accelerated by heating the raw material.

Optionally the opening 11 is closed after hardening of the foam insulation layer 8, by providing and securing a sealing element 35 with a conical shape which is provided for simple placement of the skeleton framing segment 1 on another skeleton framing segment 1 with a complementary shape.

Such a sealing element 35 may, for example, be manufactured from a metal such as aluminium or a stainless steel, or from a hard plastic. If needed a hole is first drilled or milled into the skeleton framing panel 1, in order to be able to fit the sealing element 35. This is also the case for a half-open assembly 2 to which such a conical sealing element 35 is applied, although its sealing function is lost then.

In both the first and the second preferred embodiments of the method according to the invention, the foam insulation 8 needs to be foamed and hardened during a predetermined period T; in the first preferred embodiment this is the period after which the compressive forces of the clamping table or press 31 can be removed, and in the second preferred embodiment it is the period after which the second flat panel 13 can be applied and secured. This predetermined period may be a fixed period of 1-120 minutes, preferably a period of 10-90 minutes, more preferably a period of 15-60 minutes, and even more preferably 15-45 minutes. It was apparent from certain tests on a closed assembly 2 with raw materials for polyurethane foam that a period of 15 minutes was too short since the skeleton framing panel 1 was still pressed out during further hardening. For given dimensions of the compartment 5 and given process parameters, the person skilled in the art can easily determine this predetermined period T by carrying out routine tests. The predetermined period T is preferably as short as possible to obtain a higher production throughput, but long enough to minimise the risk of damage to the skeleton framing segment.

Alternatively this period T can be calculated on the basis of the dimensions L, B, 9 of the compartment 5 and, if desired, the desired thickness 15 of the foam insulation layer 8 to be applied, taking into account known reaction speed tables and hardening tables of the raw materials used, or known calculation methods. By calculating the period as a function of the dimensions B. L, 9 of the compartments 5 of the panel (or the panels if more of them are present in the press 31), the production rate can be increased even further without increasing the risk of damage. Of course measurements should first be carried out for this purpose in order to calibrate the process.

Optionally the method according to the invention also comprises the step of measuring the humidity and/or the ambient temperature, and the measured humidity and/or ambient temperature is also taken into account when calculating the predetermined period T.

A Device

The invention also relates to a device 19 for implementing the aforementioned method. A first and second preferred embodiment of such a device 19 for implementing the first and second preferred embodiment of the method are shown in FIGS. 11-14, and 15-16 respectively. FIGS. 11A and 15A show a first variant in which the data carrier 40 itself contains the data of the assembly 2, FIGS. 11B and 15B show a second variant, in which the data carrier 40 contains an identification code (e.g. a reference or reference number) for retrieving the CAD data of the assembly 2 (or part thereof) from the common database 21, optionally after format conversion.

Hereafter first the common characteristics of the device 19 are explained, followed by a description of two preferred embodiments.

The present invention provides a device 19 for manufacturing a pre-insulated skeleton framing segment 1 for a building to be constructed, comprising:—a digital computer system 20 connected to reading means provided for reading a data carrier 40 fitted to an assembly 2 which has at least one compartment 5 with a hollow space 14, which compartment is to be filled at least partially with a foam insulation layer 8, whereby the data carrier 40 contains data of the at least one compartment 5, from which the quantity of raw materials required for forming the foam insulation layer 8 with a predetermined thickness 15 in the at least one compartment 5 can be determined;—and whereby the digital computer system 20 is provided with a calculation unit and a computer program for determining a quantity of raw materials to be inserted in the at least one compartment 5 for forming a foam insulation layer 8 with the predetermined thickness 15 on the basis of the data on the data carrier 40;—a nozzle 25 for providing the determined quantity of raw materials in the at least one compartment 5;—a supply station 18, connected to the digital computer system 20, for supplying the raw materials to the nozzle 25;—a timer (or clock) connected to the digital computer system 20, for measuring a predetermined period T during foaming and hardening of the foam insulation layer 8 in the at least one compartment 5.

Note that this form of device 19 does not necessarily comprise assembly unit 22, but it does contain the filling unit 24. In most cases the timer is part of the computer system 20 of the filling unit 24 itself.

The term "computer system" refers to the one or more digital computers of the filling unit 24 and/or the assembly unit 22, and optionally also to the computer which comprises the drawing program for producing the CAD data. This digital computer (these computers) may or may not be connected to each other. In the FIGS. 11 and 15 this is represented in an abstract way by the block with reference number 20. The "computer program" for this computer system 20 may therefore consist of one or several code fragments.

Optionally the device 19 may comprise an assembly unit 22 for manufacturing the assembly 2 for forming the skeleton framing segment 1; and—identification means for providing the data related to the at least one compartment 5 on the data carrier 40.

The identification means can e.g. comprise a label printer or a laser burner which can burn an alphanumerical character string or a number directly onto the frame 4, or a barcode printer, or a paint gun, or an RFID writer, or an electric/magnetic writer, or the like.

The reading means can e.g. comprise a laser-scanner, a 1D or 2D barcode reader, a camera, a magnetic card reader, an electronic card reader, or an RF-ID chip reader, or any other reading means known to the person skilled in the art. The reading means are connected to the digital computer system 20, and comprise the software routines required for interpreting the read data. The reading means may be activated and displaced automatically to the data carrier 40, or by an operator of the filling unit 19.

In an embodiment the device 19 further comprises a database 21 connected to the digital computer system 20, in which CAD data as a digital representation of a 3D computer model of the assembly 2, is stored under an identification code which is applied to the data carrier 40, and whereby the digital computer system 20 is provided to retrieve the CAD data or (part thereof) from the database 21 on the basis of the identification code.

As indicated above, this CAD data is generally directly generated by a drawing programme, according to the plan 16 of the building to be constructed, but it may also be a derivative thereof (e.g. format conversion). It is important that the data are consistent. The database 21 may e.g. be an internal or external hard disk, connected to the computer system 20.

In one embodiment the device 19 comprises both the filling unit 24 and the assembly unit 22. In that case the assembly unit 22 is preferably also connected to the database 21. Preferably the assembly unit 22 comprises:—feeding means (e.g. conveyor belt) for feeding a plurality of beams 10;—sawing means (e.g. circular saw, CNC saw) for sawing the beams 10 to a predetermined length;—positioning means (e.g. robot arm) for positioning the beams 10 in a predetermined position and orientation relative to each other; securing means (e.g. pneumatically driven nailing unit) for securing the beams 10 to each other to form a frame 4;—feeding means for feeding the first flat panel 3 with dimensions W, H corresponding to those of the frame 4;—positioning means for positioning and orientating the first flat panel 3 on the frame 4, and securing means (e.g. pneumatically driven nailing unit) for securing the first flat panel 3 to the frame 4, wholly according to the CAD data.

As described above, automatic assembly units 22 are commercially available. By combining the assembly unit 22 with the filling unit 24 according to the invention, and by using thereby the same (or converted) CAD data, it is possible to provide an integrated and fully automatic production machine, the advantages of which have already been mentioned above.

The supply station 18 is preferably provided for supplying at least one liquid raw material.

The supply station 18 is preferably provided for supplying a polyol and an isocyanate for forming a polyurethane foam. If desired a fire-retardant component may be added thereto, which choice can be made optionally for each compartment 5.

Optionally the device 19 further comprises heating means (not shown) for heating the raw materials.

Optionally the device 19 further comprises hot air blowers for heating the skeleton framing panels 1 before inserting the raw materials in it. In a typical implementation there are four such hot air blowers, each with a power of e.g. 12 kW, but a different number of air blowers, or air blowers with a different power are also possible.

The determined quantity of raw materials may e.g. be applied by controlling one or more flaps or valves 53 by means of the computer system 20, for regulating the flow rate and/or by activating the injection pumps of the tanks 17.

Example 1: Device for Method with Closed Assembly

FIG. 11A and FIG. 11B show a block diagram of a first preferred embodiment of a device 19, whereby a closed assembly 2 is provided as an intermediate product to the filling unit 24. The difference between FIG. 11A and FIG. 11B is that the data carrier 40 fitted to the assembly 2 in FIG. 11A itself contains the data for determining the required raw materials, whereas they have to be retrieved from the database 21 in FIG. 11B. Unless explicitly indicated otherwise, all that is described for FIG. 11A also applies to FIG. 11B, and vice versa. FIG. 11 refers to both FIG. 11A and FIG. 11B.

FIGS. 11-14 show a fully automatic and computer-controlled embodiment of the device 19, although this is not necessary for the invention. Certain parts may also be controlled manually, such as e.g. the insertion of one or more assemblies 2 in the press 31, as will be described further. Also note that the assembly unit 22 is not necessarily part of the device 19 according to the invention.

The operation of the device 19 of FIG. 11 is as follows: It is shown schematically at the bottom of FIG. 11 that the starting point is a plan 16 of a building to be constructed. "Plan" also refers to "specification". These data are converted to a CAD drawing (e.g. by a draughtsman), making use of a powerful drawing program, and the CAD data is stored in a database 21, e.g. a network drive. The conversion of the plan 16 to the CAD data may optionally take place on a separate computer in a separate space, but ultimately the CAD data is stored in a database 21, which is connected to the assembly unit 22, and optionally also to the filling unit 24 (FIG. 11B), so that both units 22, 24 have consistent data. As described above the latter is also possible by passing on the relevant data from the assembly unit 22 to the filling unit 24 by making use of a data carrier 40 fitted to assembly 2 itself.

An assembly unit 22 is shown on the left-hand of FIG. 11. To understand the present invention it is sufficient to know that beams 10 and flat panels 3, 13 are supplied to the assembly unit 22, and that ready to use substantially closed assemblies 2 are produced. Such assembly machines are commercially available from the company Weinmann®, thus no detailed explanation is required. The result is an assembly 2 as shown in FIG. 4A, where part of the second panel 13 is not shown for illustrative reasons. The assembly 2 is then provided with a data carrier 40, e.g. a barcode 40 from which the quantity of raw materials required to form the insulation layer 8 with a predetermined thickness 15 in the at least one compartment 5, can be determined.

If no openings 11 to the hollow spaces 14 to be filled were foreseen in the assembly 2 yet, their positions X1, X2, X4 (FIG. 14) are determined on the basis of the data on the data carrier 40, and these openings 11 are created in the assembly 2 by opening means, e.g. a drill or a (milling) cutter. These openings 11 are preferably provided in the frame 4 and not in the flat panels 3, 13.

The assembly 2 may optionally be tilted or turned over by positioning means 23, as these are e.g. commercially available from the company Weinmann® under the term "butterfly turning table". Optionally the assembly 2 may be temporarily stored in a buffer zone (not shown).

In the centre of FIG. 11 the assembly 2 is introduced in a lying position into the filling unit 24, via a feed table 32. This feed table 32 may e.g. comprise rollers which are activated manually (by the operator) or automatically by the computer system 20. The assembly 2 is then fed to the press 31 (also called clamping table or bracing table). During or before or after feeding into the filling unit 24 the data carrier 40 (e.g. a barcode) is read, and the data of the compartments 5 to be filled is determined.

Figure 14:
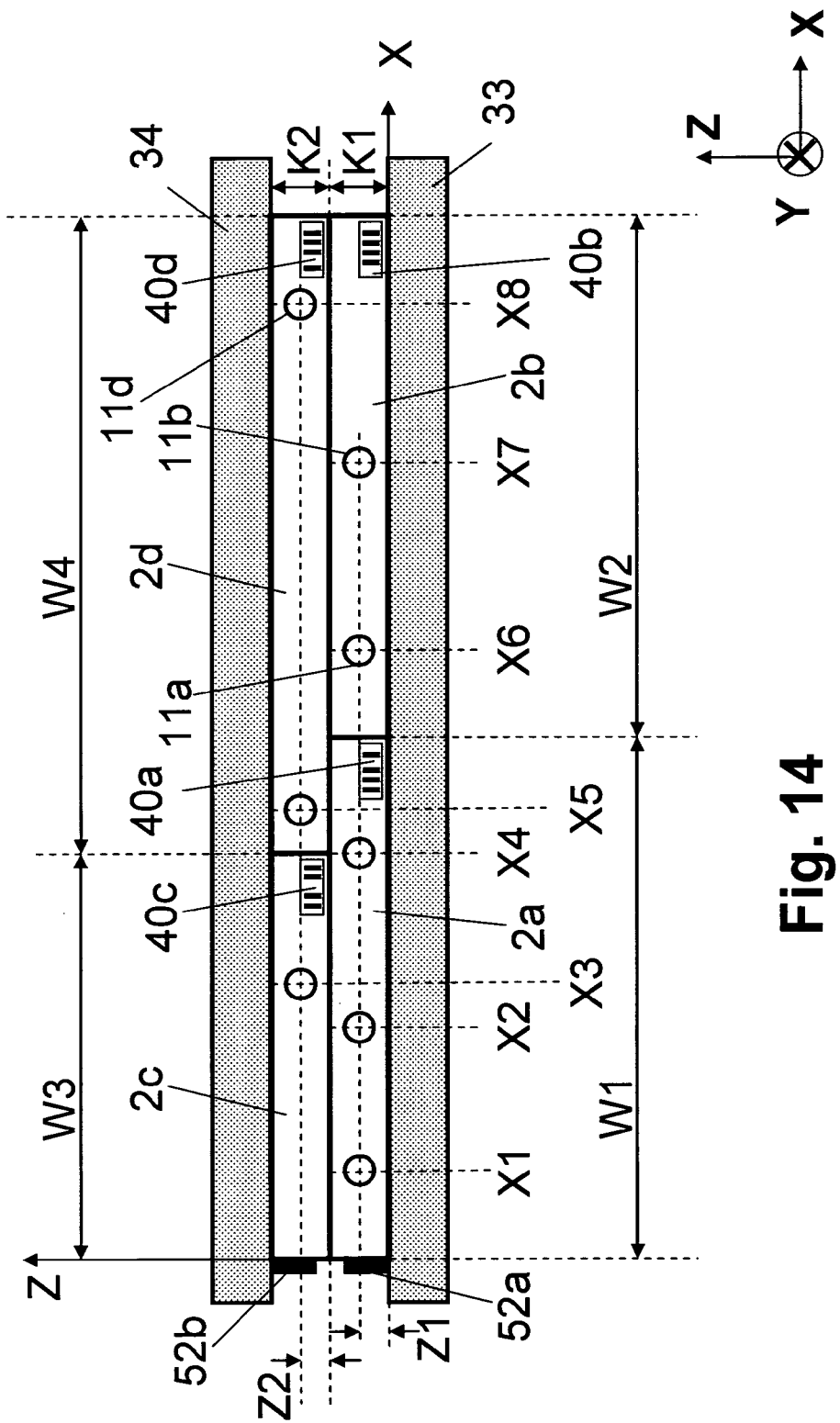
FIG. 14 shows another example of the filling unit of FIG. 12 in a side view, four assemblies being inserted in the press, next to and above each other, with an indication of the positions of the openings.

The retrieved data may e.g. comprise the number and positions of the compartments 5 to be filled, the shape (e.g. triangular or rectangular) and the dimensions (e.g. length L, width B, height 9) of each compartment 5, and the positions X1, X2, X4 of the openings 11 (FIG. 14). From the shape and dimensions of each component 5 to be filled the computer system 20 calculates the volume of the hollow spaces 14, and calculates from this the quantity of the raw materials to be inserted. This may be implemented by means of a look up table or by means of a mathematical formula, taking into account any additives.

FIG. 11 shows (top centre) a supply station 18 with two tanks 17 as container of the raw materials. Polyurethane, for example, is formed by a mixture of two liquids: isocyanate and polyol, optionally with the addition of additives. PU-stations are available on the market, and information about this is freely available, and therefore needs no further explanation here.

Figure 12:
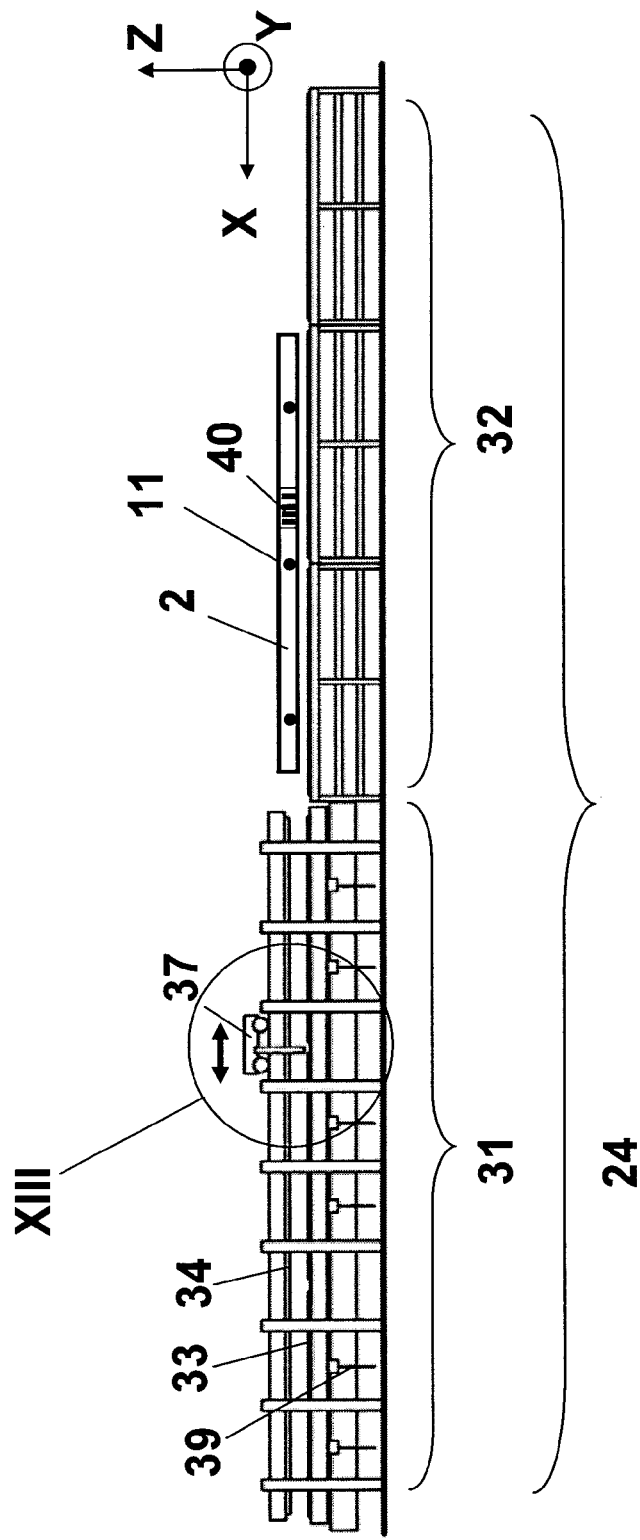
FIG. 12 shows an embodiment of the filling unit of FIG. 11A and FIG. 11B in a side view.

FIG. 12 shows (right) an example of a feed table 32 upon which an assembly 2 with a data carrier 40 is ready to be inserted into a press 31 (left).

Figure 13:
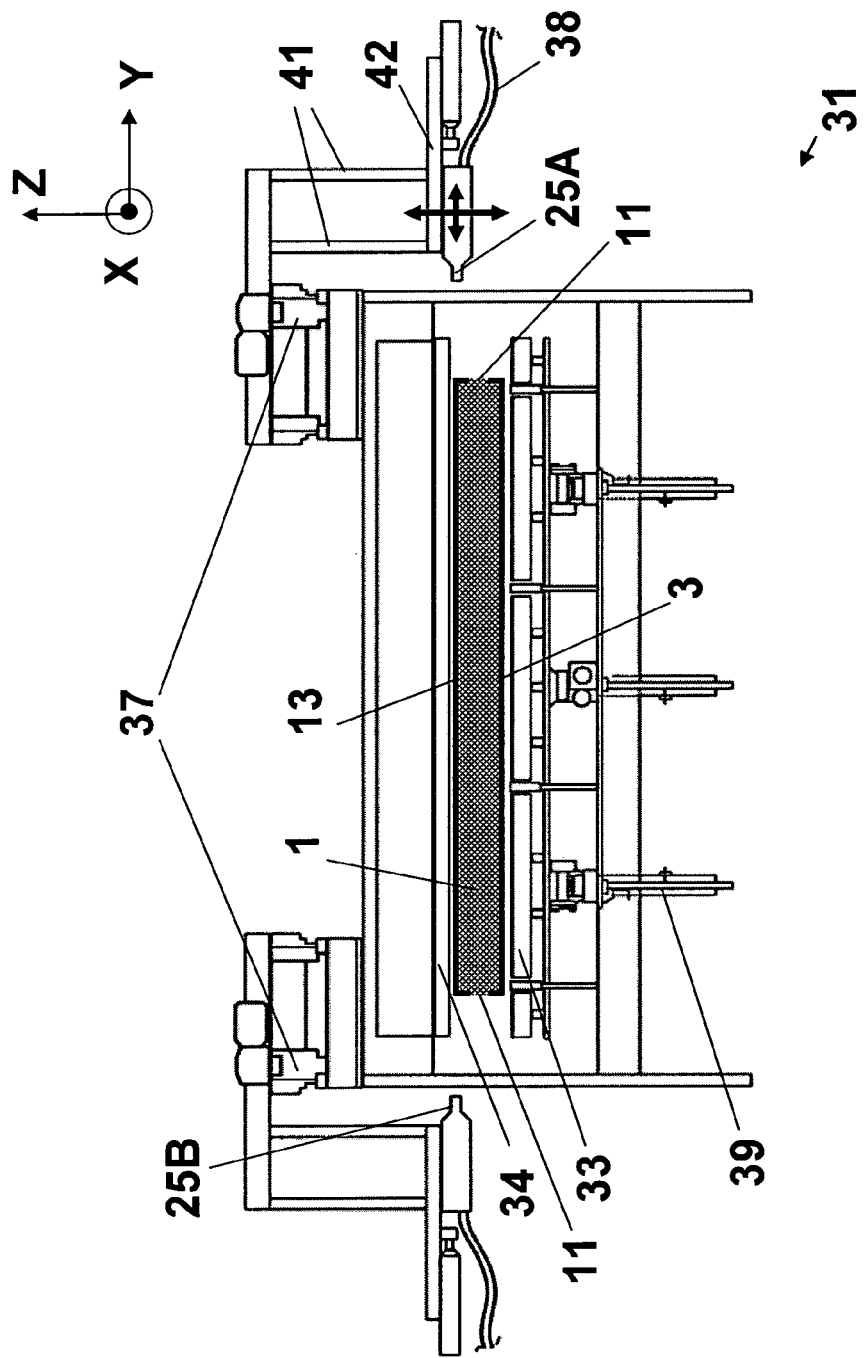
FIG. 13 shows the filling unit of FIG. 12 in more detail and in a front view.

FIG. 13 shows an example of a press 31 in more detail. The assembly 2 is then inserted between a first (bottom) clamping plate 33 and a second (top) clamping plate 34 of the press 31, and pressed against the end stops 52 (e.g. with a pneumatic piston, not shown). The clamping plates 33, 34 are provided for exerting compressive forces on the first and the second flat panels 3, 13 of the assembly 2 in the direction of the frame 4. In FIG. 13 the top clamping plate 34 is a fixed plate, and there are three bottom clamping plates 33 which can be moved upwards by pinions 39 driven by a motor and a common drive shaft, thereby clamping the assembly 2. The clamping plates 33, 34 are preferably metal plates, e.g. manufactured from steel or stainless steel.

The press 31 further comprises two nozzles 25, which in FIG. 13 have the form of two injection nozzles 25A, 25B for injecting the raw materials into the openings 11. The positions X1, X2, X4 of the openings 11 of the first assembly 2 (see FIG. 14, assembly bottom left) are determined from the data on the data carrier 40 (directly or indirectly via retrieving the CAD data), and the injection nozzles 25 are positioned in front of or in the openings 11 of the assembly 2. Thereto the injection nozzles 25A, 25B are installed one or two carriages 37, which can be moved in the X direction on rails on top of the clamping table 31, and by means of first and second positioning means 41, 42 (e.g. motors or pistons or the like, not shown) also in the Y and Z directions. Other prior art embodiments for moving injection nozzles 25 known to the person skilled in the art may however also be used, e.g. a robot arm. The device 19 shown in FIG. 13 has a carriage 37 with two injection nozzles 25A, 25B, one on each side of the clamping table 31. The carriages 37 may be connected to each other or may be driven separately.

When a plurality of assemblies 2a, 2b, 2c, 2d are inserted in the press simultaneously (FIG. 14), it is clear to the person skilled in the art that the retrieved position of the openings 11, e.g. X6, should be seen as a position relative to the assembly 2b to which it belongs. In order to know the absolute position of opening 11a relative to the press 31, the length W1 of the first assembly 2a must be added to it, assuming that the absolute position of the end stop 52 is zero. In order to know the absolute position of the openings of the higher positioned assembly 2d, the height K1 of the underlying assemblies 2a, 2b and the length W3 of the adjacent assembly 2c must be taken into account along with the relative position X8, Z2 of the opening 11d. The absolute position of 11d relative to the press 31 is therefore X8+W3, K1+Z2. The shape of the end stops 52 is only represented schematically and they can be implemented differently in practice.

The mutual positions of the assemblies 2a-2d in the press 31 may be established automatically, semi-automatically or manually, e.g. by the operator. In an automatic configuration the assemblies 2 may e.g. be scanned whilst they are being displaced on the feed table 32 towards the press 31. Alternatively the assemblies 2 can first be placed in the press 31, and e.g. a laser beam can search (scan) which assemblies 2a-2d are placed in the press 31, and where. A semi-automatic configuration may e.g. be entered by the operator who consecutively scans the labels 40a-40d with a hand scanner, and after each scan indicates where the scanned assembly 2 is located in the press 31, e.g. "bottom left", without having to enter exact data, which is much faster and is much less susceptible to error. Variants of this are of course easy to conceive by the person skilled in the art. After the assemblies 1a-1d are identified, the computer system of the filling unit 24 can calculate the positions of the openings 11 on both sides of the press 31, as well as the quantity of raw materials which has to be injected in each position 11. It is an enormous advantage that the operator does not to have to program the filling unit 24 himself (e.g. the exact positions of the openings 11, which of the compartments 5 must be filled and which not, and how much has to be injected into each compartment). Note that the compartments 5 which are not to be filled are determined automatically, and therefore need not to be entered by the operator.

Optionally hot air is first injected into the openings 11 in order to pre-heat the air in the hollow space 14 in order to promote spreading of the raw materials and the foam. It is also possible to heat the clamping plates 33, 34, e.g. by blowing hot air, or by allowing hot water to flow in the clamping plates 33, 34, so that the entire assembly 2 is heated. The calculated quantity of raw materials is then injected into each opening 11 of the compartments 5 to be filled, with their hollow spaces 14. The liquid raw materials are in this case preferably fed through hoses 38 since in practice the "wet part" of the device 19, in particular the PU supply station 18, is preferably installed in a separate space. Optionally a fire-retardant raw material may be added, the quantity of which is also calculated. After injection of the raw materials, the injection nozzles 25 are removed from the assembly 2 so that the openings 11 are free to allow any excess foam material 8 to escape. According to the invention this excess quantity of foam material 8 will be minimal. The raw materials will react with each other to form polyurethane foam, which will foam and slowly harden. During this hardening a pressure will be exerted on the first and second flat panel 3, 13, which compressive forces are counteracted by the clamping plates 33, 34 which, during a certain period T, remain pressed against the assembly 2. The clamping plates in FIG. 13 may exert a compressive force on the assembly 2 of e.g. 1.0-4.0 kg/cm², e.g. 1.6 kg/cm², but other pressures are also possible. The predetermined period T may be a fixed period or can be calculated from the retrieved data of the assemblies located in the press 31. If case multiple assemblies 2 are located simultaneously in the press 31, of course the highest value of T must be taken into consideration before opening the press. After the predetermined period T the lower clamping plate 33 is moved downwards again, and the pre-insulated skeleton framing panel 1 can be removed from the clamping table 31, thereby obtaining a skeleton framing segment 1 as shown in FIG. 7A.

A further optimisation is however possible. For it appears from tests that the filling of compartments with largely different dimensions cannot be achieved to the optimum degree employing only one single method. For example, a "long, narrow" compartment with dimensions of e.g. 20 cm×20 cm×280 cm, should preferably be filled in a different manner than a "small square" compartment with dimensions of e.g. 60 cm×60 cm×20 cm, for achieving a good filling and foaming.

Thereto the device 19 preferably has a calibration status and a production status, and a memory, —whereby the digital computer system 20 is provided with a first software code fragment for storing in the memory a list of compartments 5 with their dimensions L, B, 9, together with suitable process parameters for inserting the raw materials in those compartments 5, when the device is in the calibration status;—and whereby the digital computer system 20 is provided with a second software code fragment for determining process parameters for inserting the determined quantity of raw materials in the at least one compartment 5 on the basis of dimensions L, B, 9 of the at least one compartment 5 and on the basis of the list in the memory, when the device is in the production status.

By compiling a list of test patterns (compartments 5 with their dimensions L, B, 9), together with associated suitable (optimised) process parameters for inserting the raw materials in the compartments, and by storing this list in the memory during a calibration status of the device 19, the best match for each compartment 5 to be filled having specific dimensions, can be sought between the stored test patterns during the production status, for determining process parameters for inserting the quantity of raw materials. Optionally process parameters may be calculated by interpolation between two or more test patterns. The resultant process parameters are then used while filling to obtain a substantially optimum result (step 105 in FIG. 4A, or step 207 in FIG. 4B). During the calibration phase e.g. a plurality of test assemblies 2 with compartments 5 of different dimensions, (e.g. with a length L ranging from 20 cm to 60 m in steps of 10 cm, and a depth B ranging from 40 to 280 cm in steps of 20 cm, and a thickness 9 ranging from 15 cm to 30 cm in steps of 5 cm) may be filled in two or more ways with different process parameters, and the quality of the foam insulation layer 8 can be examined, e.g. by means of a destructive test, or by means of thermography, or by any other method known to the person skilled in the art. The process parameters giving the best result are retained and stored in the memory. The process parameters may e.g. comprise: the number of injections into the compartment 5 (e.g. "1" if the entire quantity of raw materials is inserted in one go, or "2" if the injection of the determined quantity is carried out in two steps), the time between the 2 steps, the percentage of raw material which is injected in each step, the type of nozzle 25 used for each injection, how deep the nozzle 25 is placed inside the opening 11 of the frame 4, the pressure used for each injection, the temperature of the raw materials, the over-filling 0 used, etc. In order to limit the number of tests to a reasonable number, heuristics may hereby of course be used. A major advantage of this is that the filling unit 24 uses (substantially) optimal process parameters for each compartment 5 of (substantially) arbitrary dimension. Such a filling unit 24 may e.g. comprise two or three types of nozzles 25 which are mounted on both sides of the press 31 on one or more carriages 37. Of course the computer system 20 controlling all this, is provided with the required software code fragments.

If necessary an opening 50, 51 for a window and/or a door is then made in the skeleton framing segment 1 by means of finishing means 30 (right of FIG. 11), for example by means of a circular saw. The result is a pre-insulated skeleton framing panel 1 as shown in FIG. 7A-7D, which can be transported to the site.

Optionally the device 19 further comprises closing means (not shown) for fitting and securing a sealing element 35 to the assembly 2 at the location of the opening 11.

Typical dimensions for a skeleton framing panel 1 according to the invention are, for example, W=0.20-15.00 metres long×H=0.50-6.00 m high×K=6.0-35.0 cm thick, with all combinations of all intermediate values. A typical length of a compartment is 40.0-60.0 cm. The feed table 32 (FIG. 11) may e.g. be 12 metres long, but other dimensions smaller or larger than 12 m are also possible, e.g. 15 metres. The feed table 32 may e.g. be used as a buffer for storing a next skeleton framing panel 1, until the clamping table 31 is free again.

FIG. 14 shows how a plurality of assemblies 2 can be placed next to and/or on top of each other in the press 31. Preferably in this case the feed table 32 is displaceable in the vertical direction (Z) (e.g. electrically or pneumatically or hydraulically) between a bottom and a top position. The insertion of the four assemblies 2a-2d can then e.g. be carried out as follows: first the bottom assemblies 2a, 2b are inserted in the press 31 at the normal height, the assembly 2a being positioned against the end stop 52a, and assembly 2b against assembly 2a. Then assembly 2c is placed on the feed table 32, the feed table 32 is moved to the top position (height K1) and the assembly 2c is pushed into the press on top of the assemblies 2a and 2b against the end stop 52b, then the feed table 32 is lowered back to its normal height for receiving assembly 2d, the feed table 32 is moved again to its top position and assembly 2d is pushed against assembly 2c.

Instead of a press 31, as shown in FIG. 13, a press may also be used with a bottom clamping plate 33 which is fixed, and with a top clamping plate 34 which can be displaced by means of hydraulic pistons. Other embodiments for exerting compressive forces known to the person skilled in the art may however also be used.

Tests in which the raw materials for PU were injected at a pressure of almost 100 bars have shown that even narrow hollow spaces of 6 cm×380 cm×17 cm can be filled substantially perfectly in this way.

Example 2: Device for Method with Half-Open Assembly

FIGS. 15A and 15B show two variants of a block diagram of a second preferred embodiment of a device 19 according to the invention. The difference between the device in FIGS. 15A and 15B is again the fact that in the one case the data carrier 40 itself contains the data of assembly 2 (FIG. 15A), whilst they must be retrieved from the database 21 in FIG. 15B. This block diagram resembles that of FIG. 11 very closely, therefore only the most significant differences will be described.

On the left-hand side of FIG. 15 an assembly unit 22 is shown, similar to that in FIG. 11, except that this one manufactures a half-open assembly 2, with a first flat panel 3 secured to a frame 4. The assembly 2 may optionally be tilted or turned over by positioning means 23 (e.g. a "butterfly turning table"). Optionally the assembly 2 may be temporarily stocked in a buffer zone (not shown).

In the centre of FIG. 15 an assembly 2 is received and fed to the filling unit 24. On the assembly 2 e.g. a 2-dimensional barcode 40 is fitted, which is read by a barcode reader. The computer system (or the computer) of the filling unit 24 connected to the barcode reader reads the data of this assembly 2, or retrieves the CAD data from the database 21, as described above. These data comprise, among other things, the number and position of the compartments 5 to be filled (see FIG. 16), and the shape and dimensions of each compartment 5 to be filled, and optionally also the desired thickness 15 of the foam insulation layer 8 to be applied in each compartment 5 if this is different from 100%. From this data the computer system 20 calculates the volume of the foam insulation layer 8 to be applied, and calculates from this the quantity of the raw materials to be inserted using a look up table or a mathematical formula.

In contrast to the first preferred embodiment (FIG. 11), no openings 11 need to be made here in the frame 4, and the assembly 2 need not be clamped in a press 31. The filling by filling unit 24 for this device 19 is represented schematically in FIG. 8B. The filling unit 24 comprises at least one nozzle 25, which in this second embodiment of the device 19 e.g. takes the shape of a spray nozzle 25 which is placed above the compartment 5 to be filled so that it is able to insert the determined quantity of raw material in, and distribute it uniformly over compartment 5, both on the bottom 6 and against the upright walls 7. Alternatively the assembly 2 is displaced under the at least one nozzle or spray nozzle 25. Preferably a plurality of nozzles or spray nozzles 25 is used simultaneously. The supply of raw materials can, for example, be regulated by the opening or closing of flaps or valves 53. According to the invention the applied quantity of raw materials will be determined so that a desired thickness 15 of the foam insulation layer 8 is approached as closely as possible. After the raw materials are inserted the foam insulation layer, e.g. polyurethane foam, will foam and slowly harden. This foaming without second flat panel 13 is called free foaming, and if the same raw materials are used the density of the foam will in this case be lower than in the case of the closed assembly 2.

Optionally this device 19 further comprises removal means 27, represented schematically in FIG. 9C for removing the portion of the foam insulation layer 8 which projects above an upright wall 7 of the frame 4. This is particularly needed when the desired height 15 of the foam insulation layer 8 approaches the thickness 9 of the frame more closely. The removal means may, for example, be a band saw.

General

As described above, the device 19 comprises a timer, in most cases as part of the computer system 20, for measuring the predetermined period T, after which in one case the press 31 is opened, and in the other case the second flat panel 13 is fitted and secured to the frame 4. This period T may be a fixed period, or may be a calculated period. In the latter case the computer is preferably provided with a software code fragment for calculating the period T on the basis of dimensions L, B, 9 (in the case of the closed assembly), or of dimensions L, B and the predetermined thickness 15 (in the case of the half-open assembly) for setting the timer, if used.

Optionally the device 19 may further comprise a sensor for measuring the humidity and/or the ambient temperature of the filling unit 24, and the measured humidity and/or the measured ambient temperature is taken into account in the calculation of the period T.

Computer Program

The invention also relates to a computer program directly loadable into the internal memory of the digital computer system 20 of a device 19 according to the invention, comprising software code fragments for implementing the method steps described above.

In its most elementary form such a computer program will contain code fragments:

- for activating the reading means (e.g. a barcode reader) for reading the data on the data carrier 40, and/or for retrieving the CAD data from the database 21;
- for determining the quantity of raw materials which is to be inserted in the at least one compartment 5 of the assembly 2 for forming a foam insulation layer 8 with a predetermined thickness 15 according to the plan;
- for programming the timer for inserting the determined quantity of raw materials.

In a more extensive form the computer program may further comprise software code fragments for executing one or more of the following tasks:

- activating the flaps or valves 53 for inserting the raw materials in the at least one compartment;
- calculating the positions of the openings 11 of the compartments 5, and for driving the carriage 37 and the positioning means 41, 42 for displacing the nozzle 25;
- activating the pumps of the supply station 18;
- activating the heating means of the supply station 18;
- activating the press 31 for opening/closing it;
- activating the feed table 32;
- activating the closing means for fitting and securing the sealing element 35;
- activating the securing means 26 for fitting and securing the second flat panel 13 on the half-open assembly 2;
- activating the removal means 27 for removing a portion of the foam insulation layer 8 which projects above an upright wall 7 of the frame 4;
- reading the sensors 29 for measuring the humidity and/or ambient temperature.

It is clear to the person skilled in the art, from the description and figures, that as the most important advantages of the method and device 19 according to the invention can be mentioned, that there is less waste of insulating material 8 because the quantity of insulating material 8 is adapted to the spaces to be filled, and that the risk of damage to the panel as a result of foam expansion is eliminated. The method according to the invention provides the additional advantage that it can be highly automated, and that errors between the assembly unit and the filling unit are eliminated by making use of the data carrier enabling the data of the assembly to be retrieved. Furthermore, the skeleton framing panels according to the present invention have a better finishing since no openings need to be made and sealed in visible locations, thereby considerably reducing labour costs. By making use of a high quality foam insulation material such as polyurethane, a skeleton framing panel with particularly favourable properties (thermal, mechanical) is provided, with less waste of raw materials. The method and device described are especially suited for manufacturing so-called passive apartments, or zero energy apartments with largely differing shapes and dimensions, in an economic manner, despite the enormous investment costs for the device, despite the relatively long waiting time for foaming and hardening of the foam insulation material, and despite the relatively high cost of the raw materials.

Although the present invention is described on the basis of specific preferred embodiments, it will be clear that various modifications can be made to these embodiments without deviating from the scope of protection of the invention as set forth in the claims. Consequently the description and drawings should be considered in an illustrative sense rather than a limiting sense.

The invention claimed is:

1. A method for manufacturing a pre-insulated skeleton framing segment for buildings of various dimensions, comprising:
   a) receiving an assembly which is manufactured on the basis of a 3D computer model represented by CAD data which is stored in a database under an identification code of the assembly, the assembly having at least one compartment with a hollow space which is to be filled at least partially with a foam insulation layer, and wherein a data carrier containing the identification code is fitted to the assembly;
   b) reading the data carrier;
   c) retrieving the CAD data of the assembly from the database on the basis of the identification code, and calculating a quantity of raw materials which are to be inserted in the at least one compartment for forming the foam insulation layer with the predetermined thickness on the basis of the retrieved CAD data;
   d) inserting the calculated quantity of raw materials in the at least one compartment for forming the foam insulation layer with the predetermined thickness; and
   e) allowing the foam insulation layer to foam and harden in the at least one compartment during a predetermined period.

2. The method according to claim 1, further comprising the steps:
   f) manufacturing the assembly;
   g) providing the data carrier with the data of the at least one compartment, and fitting it on the assembly.

3. The method according to claim 1, wherein the manufacturing of the assembly according to the CAD data comprises the steps:
   providing a plurality of beams, and sawing the beams to predetermined lengths;
   positioning the beams in a predetermined position and orientation relative to each other;
   securing the beams to each other to form a frame;
   providing a first flat panel with dimensions corresponding to those of the frame;
   securing the first flat panel to the frame.

4. The method according to claim 1, wherein the assembly is a substantially closed assembly comprising the first and a second flat panel, secured parallel to each other and at a distance from each other to a frame so that the frame is located between the first and the second flat panel for forming the hollow space between the flat panels;
   and wherein the predetermined thickness of the foam insulation layer to be applied is equal to the distance between the first and the second flat panel to substantially completely fill the hollow space;
   and wherein the at least one compartment is provided with at least one opening which is made in the frame for the insertion of a nozzle for injecting the raw materials for forming the foam insulation layer;
   and wherein the method further comprises the steps of inserting the assembly in a press, and exerting compressive forces on the assembly during the predetermined period after insertion of the raw materials, to thereby counteract forces exerted by the foam insulation layer on the assembly during its foaming an hardening.

5. The method according to claim 4, wherein a position of the at least one opening in the frame is determined on the basis of the data on the data carrier, and wherein the insertion of the raw materials in step d) comprises the displacement of the nozzle to the determined position to inject the raw materials for forming the foam insulation layer.

6. The method according to claim 1, wherein the assembly is a half-open assembly comprising a frame and a first flat panel secured thereto, and wherein the method further comprises the steps of:
   positioning the assembly in a lying position before the determined quantity of the raw materials is inserted in the at least one compartment;
   allowing the foam insulation layer to freely foam and harden during the predetermined period after insertion of the raw materials;
   providing a second flat panel, and after expiration of the predetermined period, securing the second flat panel to the frame in such a manner that the frame is located between the first and the second flat panel.

7. The method according to claim 1, further comprising the step of determining the predetermined period from dimensions of the hollow space and from the predetermined thickness of the foam insulation layer.

8. The method according to claim 7, further comprising the step of measuring the humidity and/or the ambient temperature, and wherein the step of determining the predetermined period takes into account the measured humidity or measured ambient temperature.

9. The method according to claim 1, the method being implemented as a computer program which is directly loadable into the internal memory of a digital computer system of a device for manufacturing a pre- insulating skeleton framing segment for a building to be constructed.

10. The method according to claim 1, further comprising a second framing segment, wherein said second framing segment comprises a different shape or a different dimension.

11. The method according to claim 1, whereby extra operations for finishing are avoided.

12. The method according to claim 1, wherein the assembly has a wooden or metal frame composed of a plurality of beams secured to each other, and a first flat panel with dimensions corresponding to those of the frame, the first flat panel being secured to the frame.

13. The method according to claim 1, wherein the assembly has a plurality of compartments comprising said at least one compartment with a hollow space.

14. A method for manufacturing a plurality of pre-insulated skeleton framing segments of a building to be constructed according to a plan, wherein each skeleton framing segment is manufactured by the method recited in claim 1, further comprising the step of converting the plan to a 3D computer model, wherein each skeleton framing segment is represented by CAD data which is stored in the database.

15. A device for manufacturing a pre- insulating skeleton framing segment for a building to be constructed, comprising:
   a digital computer system connected to a reader arranged to read a data carrier which is fitted to an assembly, the data carrier containing an identification code;
   a database connected to the digital computer system, upon which CAD data as a digital representation of a 3D computer model of the assembly is stored, and wherein the digital computer system is programmed for retrieving the CAD data from the database on the basis of the identification code;

wherein the digital computer system comprises a calculation unit and a computer program that calculates a quantity of raw materials to be inserted in at least one compartment of the assembly for forming a foam insulation layer with a predetermined thickness on the basis of the CAD data;

a nozzle arranged to insert the determined quantity of raw materials into the at least one compartment;

a supply station connected to the digital computer system and supplying the raw materials to the nozzle; and a timer connected to the digital computer system that measures a predetermined period during foaming and hardening of the foam insulation layer in the at least one compartment.

16. The device according to claim 15, further comprising:
an assembly unit configured to manufacture the assembly for forming the skeleton framing segment;
an identification device arranged to apply the data relating to the at least one compartment on the data carrier.

17. The device according to claim 15, wherein the device comprises an assembly unit connected to the database, and wherein the assembly unit comprises:
a beam feeder arranged to a feed a plurality of beams;
a saw arranged to saw the beams at a predetermined length;
a beam positioner that positions the beams in a predetermined position and orientation relative to each other;
a beam securing arrangement that secures the beams to each other to form a frame;
a flat panel feeder that feeds the first flat panel with dimensions corresponding to those of the frame;
a first flat panel positioning device that positions and orients the first flat panel on the frame, and
a flat panel securing arrangement that secures the first flat panel on the frame, wholly according to the CAD data.

18. The device according to claim 15, including a device arranged to receive a substantially closed assembly which comprises a first and a second flat panel, oriented parallel to each other at a distance from each other and secured to a frame so that the frame is located between the first and the second flat panel to form the hollow space between the flat panels,
a press that exerts compressive forces on the assembly during the predetermined period after inserting the raw materials that counteract forces exerted by the foam insulation layer on the assembly during its foaming and hardening;
a carriage arranged to displace the nozzle in a longitudinal direction of the press, said carriage being provided with a nozzle positioning device that positions the nozzle in or in front of the opening;
wherein the timer is arranged to measure the period after which the press can be opened, after insertion of the raw materials.

19. The device according to claim 15, wherein the device is arranged to receive a half-open assembly with a first flat panel secured to a frame, and wherein the assembly is positioned in a lying position so that the first flat panel is located underneath the frame, said device further comprising:
a securing device arranged to fit and secure the second flat panel parallel to and at a distance from the first flat panel so that the frame is located between the first and the second flat panel;
wherein the timer is arranged to measure the predetermined period for the free foaming and hardening of the foam insulation layer after insertion of the raw materials before applying the second flat panel.

20. The device according to claim 15, wherein the digital computer system includes a software code fragment that calculates the predetermined period on the basis of dimensions of the hollow space and the predetermined thickness of the foam insulation layer for setting the timer.

21. The device according to claim 20, wherein the device further comprises a sensor connected to the digital computer system that measures humidity and/or the ambient temperature, and wherein the algorithm for calculating the period is provided to take the measured humidity and/or the ambient temperature into account.

22. The device according to claim 15, wherein the assembly has a wooden or metal frame composed of a plurality of beams secured to each other, and a first flat panel with dimensions corresponding to those of the frame, the first flat panel being secured to the frame.

23. The device according to claim 15, wherein the assembly has a plurality of compartments comprising said at least one compartment with a hollow space.

* * * * *